US006657664B2

(12) United States Patent
Ueno

(10) Patent No.: US 6,657,664 B2
(45) Date of Patent: *Dec. 2, 2003

(54) SOLID-STATE IMAGE PICKUP DEVICE

(75) Inventor: Isamu Ueno, Hadano (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/595,173

(22) Filed: Feb. 1, 1996

(65) Prior Publication Data

US 2003/0067549 A1 Apr. 10, 2003

(30) Foreign Application Priority Data

Feb. 1, 1995 (JP) .............................. 7-015342
Jul. 3, 1995 (JP) .............................. 7-167407

(51) Int. Cl.[7] ................................. H04N 3/14
(52) U.S. Cl. ...................... 348/302; 348/241
(58) Field of Search ................ 348/302, 303, 348/304, 305, 316, 321, 300, 307, 308, 241, 306

(56) References Cited

U.S. PATENT DOCUMENTS

| 4,879,470 A | | 11/1989 | Sugawa et al. ............. 250/578 |
| 4,967,067 A | * | 10/1990 | Hashimoto et al. ........ 250/208.1 |
| 5,134,489 A | * | 7/1992 | Sauer ......................... 348/302 |
| 5,162,912 A | | 11/1992 | Ueno et al. ............. 358/213.16 |
| 5,184,006 A | | 2/1993 | Ueno ....................... 250/208.1 |
| 5,262,870 A | | 11/1993 | Nakamura et al. .......... 358/212 |
| 5,274,459 A | * | 12/1993 | Hamasaki ............... 358/213.11 |
| 5,335,008 A | | 8/1994 | Hamasaki .................... 348/301 |
| 5,434,619 A | * | 7/1995 | Yonemoto .................... 348/241 |
| 5,541,654 A | * | 7/1996 | Roberts ....................... 348/301 |

FOREIGN PATENT DOCUMENTS

| EP | 0275217 | | 7/1988 |
| EP | 0616464 A2 | | 9/1994 |
| EP | 0616464 | * | 9/1994 |
| EP | 0 627 847 A2 | * | 12/1994 |
| EP | 0627847 | * | 12/1994 |
| EP | 0630152 | | 12/1994 |
| GB | 2 071 959 | * | 9/1981 |
| JP | 6268920 | | 9/1994 |

* cited by examiner

Primary Examiner—Andrew Christensen
Assistant Examiner—Christopher Onuaku
(74) Attorney, Agent, or Firm—Fitzpatrick, Cella, Harper & Scinto

(57) ABSTRACT

A solid-state image pickup device is provided with plural blocks, each comprising at least two pixels, allowing reading of signals of pixel blocks at high speed without signal loss. The output signals of the blocks are connected in common, respectively through block buffers, thereby providing the maximum or minimum value of the pixels. Each block buffer has an input at the base of a self-biased transistor and an output in an emitter follower circuit. There also are provided first photoelectric conversion elements for reading out the photoelectric conversion charges of respective pixels and second photoelectric conversion elements for reading out the photoelectric conversion charges respectively in blocks, each composed of plural pixels, and the outputs of the second photoelectric conversion elements are connected in common to a common line through maximum output circuits.

47 Claims, 23 Drawing Sheets

SOLID-STATE IMAGE PICKUP DEVICE

BACKGROUND OF THE INVENTION

1. Field of the Invention

The present invention relates to a solid-state image pickup device.

2. Related Background Art

With the recent remarkable progress in the semiconductor technology, the solid-state image pickup device represented by the CCD has shown significant improvement in performance and has been applied in various products such as facsimile and scanner. In such trend, there are emerging more stringent requirements for the solid-state image pickup device, not only for higher performance, such as a higher sensitivity or a higher resolving power, but also for drivability with a lower voltage. As a result, in the field of CCD, there have appeared products drivable with a 5 V power source and developments are being made to achieve drivability with a lower voltage.

Also with a higher sensitivity, there is expected the application for a photodetector capable of detecting very weak light that has not been detectable and effecting signal processing on thus detected light.

Also as a highly advanced ability of the solid-state image pickup device, there is required an ability to detect whether a certain light is present, and, upon detection of the light, to provide a detailed image output of the portion of such light.

An example of the conventional bipolar solid-state image pickup device is shown in FIGS. 1 and 2. FIG. 1 is an equivalent circuit diagram of a unit pixel, which is composed of an NPN bipolar phototransistor 14, a pixel separating-resetting PMOS transistor 11, a base potential control capacitor 13, a three-value pulse supply terminal PR, and a bias reset supply terminal VBR.

FIG. 2 shows a solid-state image pickup device consisting of a one-dimensional array of four bipolar photoelectric converting elements explained above, while a three-value pulse from a three-pulse terminal 1 is in the LOW level state, a reset pulse is supplied from a reset terminal 2 to render the PMOS transistors 11 conductive, whereby the NPN transistors 14 are reset. When the three-value pulse from the three-value pulse terminal 1 is shifted to the MIDDLE level state, the gate-source voltage VGS of the PMOS transistors 11-1 to 11-4 becomes lower than the threshold value Vth of the transistors, whereby these transistors are rendered non-conductive and a first resetting operation is completed.

Then, when the reset terminal 33 is shifted to the high level state, the NMOS transistors 22 are rendered conductive and the emitters of the NPN transistors 14 are reset. Subsequently the three-value pulse terminal 1 is shifted to the high level state, whereby the bases of the NPN transistors 14 are shifted to the floating state through the control capacitances 13, and, when the three-value terminal 1 is shifted to the middle level, there is initiated the accumulation of the photon charges by photoelectric conversion. Subsequently, after the lapse of a predetermined time, a transfer terminal 32 and the three-value pulse terminal 1 are shifted to the high level state, whereby the NMOS transistors 23 are rendered conductive, and the charges accumulated in the bases are transferred to transfer capacitances 24 by the application of a high-level pulse to the reset terminal 3. Then a horizontal shift register 29, receiving a start pulse 30 and scanning pulses 31, releases scanning signals for rendering scanning NMOS transistors 25 conductive in succession, whereby the charges of the accumulating capacitances 24 are in succession transferred to an output line 42 and released to an output terminal 28 after amplification in an amplifier 41. After each signal output from the accumulating capacitance 24, a reset pulse is applied to the reset terminal 27 whereby the remaining charge on the output line 42 is dissipated to the ground through an NMOS transistor 26. The image of a line can be released through the above-explained operations, and the function as an area sensor can be achieved by repeating the above-explained operations in combination with a movement of the sensor.

As explained in the foregoing, the signals of the different pixels are once read into the transfer capacitances C24-1 to C24-4 and are then serially transferred to the output terminal by the function of the scanning circuit. The gain GT and the output voltage V0 at the transferring operation are represented by:

$$GT = (CT)/(CT+CH) \quad (i=1, 2, \ldots) \tag{1}$$

$$V0 = (CTVi)/(CT+CH) \quad (i=1, 2, \ldots) \tag{2}$$

wherein

CT: capacity of transfer capacitances C24-1 to C24-4;

CH: parasite capacitance including the capacity of the output line; and

Vi: signal voltage retained in the transfer capacitances C24-1 to C24-4.

The capacitance CH is composed of the drain capacitance and the gate overlapping capacitance of the scanning transistors 25-1 to 25-4 and the resetting transistor 26, the input capacitance of the output amplifier and the parasite capacitance of the output wiring, and is heavily dependent on the number of pixels and the manufacturing process. It is in the order of several picofarads in case of several hundred pixels. On the other hand, CT is composed of the capacitances of the MOS device and of junctions, and is designed in the order of several picofarads in the actual integrated circuit.

Consequently the above-mentioned transfer gain is usually in the order of 0.3 to 0.4, and a larger gain leads to an increased cost because of an increased chip size. Consequently a gain of several times is applied in the subsequent stages if a larger signal value is required, but a sufficient gain is difficult to obtain in a low-voltage drive because of the limited input/output dynamic range.

Also the image taking will not be required if the brightness of the image is low and does not reach the sensitivity of the pixels, but, if the image has a certain level of brightness, it is often required to obtain details of such lighted area. The image detection with a line sensor under such condition requires the scanning operation over the entire pixels, thus requiring a long time for the scanning operation with a large power consumption, and, if such brightness appears instantaneously, it is difficult to detect such instantaneous bright area.

Also in the configuration shown in FIG. 2, the time for one cycle is principally used for pixel resetting, signal read-out and serial signal transfer, and the significant part is usually used for the serial transfer. This time becomes longer with the increase in the number of pixels, and, in case of an area sensor with plural lines, most of the cycle time is occupied by the signal transfer time. Consequently, in the application for a detector for detecting the presence or absence of an image at a high speed, it is an important issue how to reduce this time.

The present inventors have disclosed, in the Japanese Patent Laid-open Application No. 6-268920, that this signal transfer time can be reduced by releasing a signal averaged over plural pixels. However, in the above-mentioned invention, though the signal averaging is easy in the horizontal direction of the area sensor, it can normally be made for 2 to 4 pixels in the vertical direction, as a larger averaging leads to an increase in the chip size. Consequently an inexpensive high-speed detector has been extremely difficult to realize with an area sensor.

SUMMARY OF THE INVENTION

An object of the present invention is to provide a solid-state image pickup device provided with an array of plural blocks each of which is composed of two or more pixels, wherein the outputs of said block are connected in common, respectively through amplifier means.

Another object of the present invention is to provide a solid-state image pickup device capable, for resolving the above-mentioned drawbacks, of outputting both an output signal obtained by pre-processing of the signals of the pixels and an output from each pixel, wherein the above-mentioned pre-processed output signal is output through output means for the signal of each pixel.

Still other objects of the present invention, and the features thereof, will become fully apparent from the following description which is to be taken in conjunction with the attached drawings.

DETAILED DESCRIPTION OF THE PREFERRED EMBODIMENTS

Figure 3:
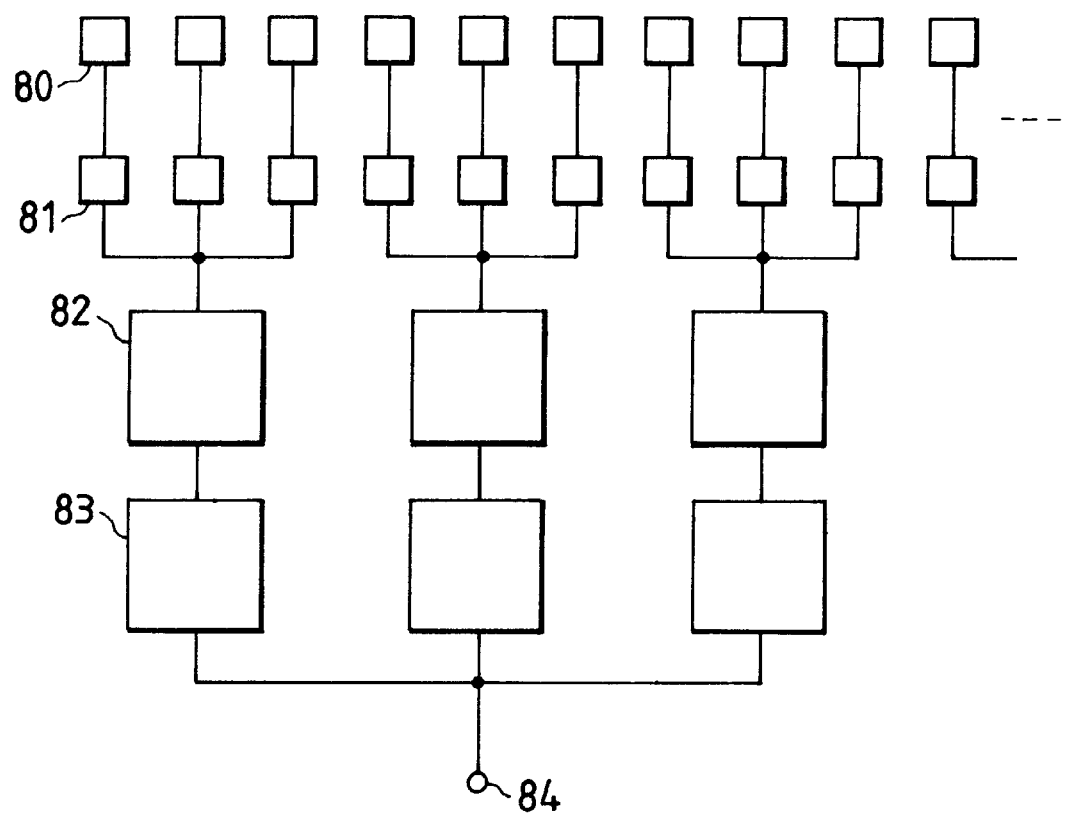
FIG. 3 is a schematic block diagram of an embodiment of the present invention.

Now the function of the present invention will be schematically explained with reference to FIG. 3, in which there are shown unit pixels 80 of a photoelectric converting element, pixel buffer means 81 for buffering pixel signals, function circuits 82 such as clamping circuits, and block buffer means 83 for buffering block signals. Signals from the pixels 80 are supplied respectively through the pixel buffers 81 and are wire-connected among every three pixels to provide block signals, which are subjected to a suitable signal processing in the function circuits 82 and wire-connected, after passing the block buffers 83, for all the blocks, whereby a signal representing all the blocks is output from an output terminal 84.

As all the above-mentioned operations are conducted collectively for all the pixels or all the blocks, there only is required an extremely short process time with a reduced power consumption. Also by constituting the block buffer means 83 with bipolar transistors and connecting the emitters thereof in common for all the blocks, the maximum value of the signals of all the blocks can be read out, without loss to the output terminal 84.

In the foregoing there has been explained the image read-out in the block form, but a higher function of the solid-state image pickup device can be achieved, by reading out the signals of the pixels constituting the blocks as in the conventional solid-state image pickup device. More specifically, the image pickup device is featured by first photoelectric conversion means for reading out photoelectrically converted charge of each pixel and second photoelectric conversion means for reading out photoelectrically converted charge of each block consisting of plural pixels, wherein the outputs of the above-mentioned photoelectric conversion means are connected, through maximum output means, to a common line. This configuration will be explained in more detail in the following embodiments.

Figure 1:
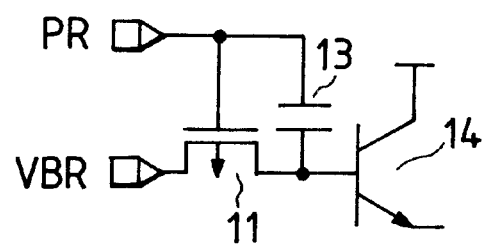
FIG. 1 is a circuit diagram of a conventional photoelectric converting element.
Figure 4:
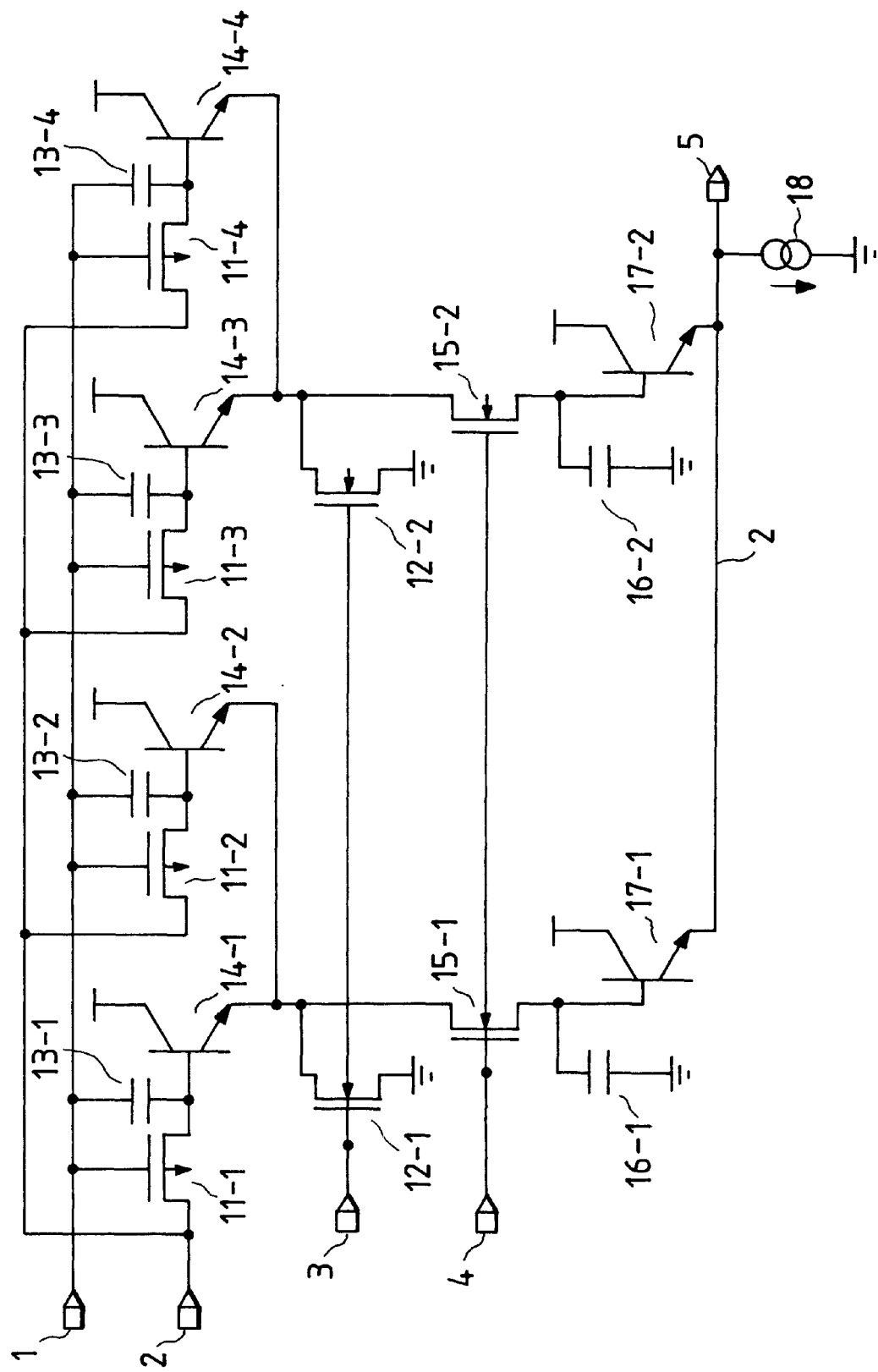
FIG. 4 is a circuit diagram of an embodiment of the present invention.

FIG. 4 illustrates a first embodiment of the present invention, composed of a one-dimensional array of four bipolar photoelectric conversion elements as employed in FIG. 1. In comparison with the configuration shown in FIG. 3, the NPN transistor 14 serving as the bipolar photoelectric conversion element, the base control capacitance 13 and the resetting PMOS transistor 11 correspond to the pixel 80. Also the emitter of the NPN transistor 14 corresponds to the pixel buffer 81, while the resetting NMOS transistor 12, the transfer NMOS transistor 15 and the transfer capacitance 16 correspond to the function circuit 82, and the NPN transistor 17 and the constant current source 18 correspond to the block buffer 83 Also a block is constituted by the NPN transistors 14-1 and 14-2, while another block is constituted by the NPN transistors 14-3 and 14-4.

Figure 5:
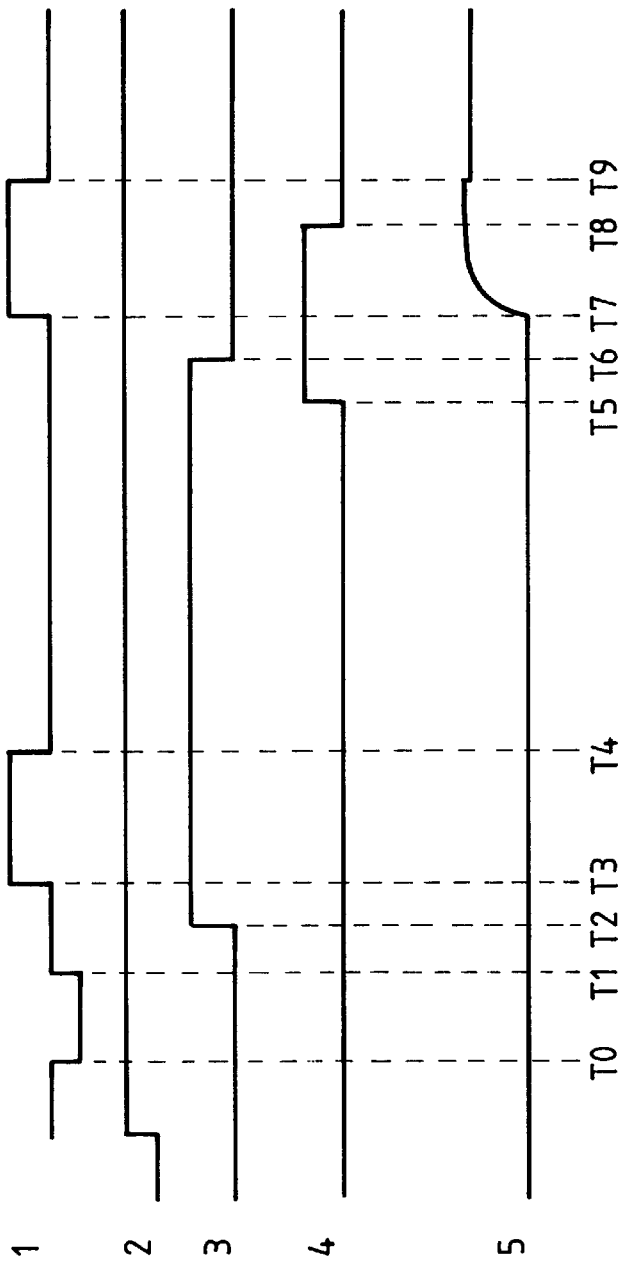
FIG. 5 is a timing chart of an embodiment of the present invention.

Now the function of the present embodiment will be explained with reference to a timing chart shown in FIG. 5.

First, at a time T0, a low level pulse is applied to the three-value pulse terminal 1 to render the PMOS transistors 11-1 to 11-4 conductive, whereby the base areas of the photoelectric conversion elements are reset to a voltage given to the reset terminal 2 (first resetting). Then, at a time T1, the pulse to the three-value pulse terminal 1 is shifted to the middle level to shift the gate-source voltage VGS of the PMOS transistors 11-1 to 11-4 to a value not exceeding the transistor threshold voltage Vth, whereby the PMOS transistors are rendered non-conductive and the first resetting operation is completed.

Then, at a time T2, a high level pulse is applied to the reset pulse terminal 3 to render the NMOS transistors 12-1, 12-2 conductive, whereby the emitters of the pixel NPN transistors 14 are reset to a reset voltage (which is the ground in the illustrated configuration). Subsequently, at a time T3, a high level pulse is applied to the three-value pulse terminal 1 to elevate the base potential of the NPN transistors 14 by the capacitative coupling through the base control capacitances 13-1 to 13-4 to generate a forward bias between the bases and the emitters, while the PMOS transistors 11-1 to 11-4 are maintained in the non-conductive state. As a result the NPN transistors 14 effect an emitter follower operation whereby the holes in the base areas in the floating state effect recombination and the base potentials are reset (second resetting).

After this resetting, at a time T4, the pulse to the three-value pulse terminal 1 is lowered to the middle level, whereby the base potentials of the pixels are shifted to the negative side to generate an inverse bias between the bases and the emitters. At this point there is initiated the accumulation of the photoelectrically converted charges in the bases.

Then, at a time T5 after a predetermined accumulation time, a high level pulse is applied to the transfer terminal 4 to render the NMOS transistors 15-1, 15-2 conductive, whereby the emitters of the NPN transistors 14 of all the pixels are connected to the capacitances 16-1, 16-2 and are at the same time reset to the ground level through the NMOS transistors 12-1, 12-2. At a time T6, the pulse to the reset pulse terminal 3 is shifted to the low level to render the NMOS transistors 12-1, 12-2 non-conductive. Then, at a time T7, a high level pulse is applied to the three-value pulse terminal 1 to shift the base potentials of all the pixels to the positive side through the capacitances 13-1 to 13-4, whereby a forward bias state is generated between the bases and emitters of the NPN transistors 14-1 to 14-4 of all the pixels. Thus the maximum voltages of the signals of the pixels 1, 2 and the pixels 3, 4 are respectively read out into the transfer capacitances 16-1, 16-2. As the transfer capacitances 16-1, 16-2 are respectively connected to the bases of the NPN transistors 17 of which emitters are connected in common to the output line 2, the maximum voltage of the transfer capacitances 16-1, 16-2 is supplied to the output line 2. With the capacity CT of the transfer capacitances 16-1, 16-2, the parasite capacity CH of the output line 2, the current amplification factor hFE of the NPN transistors and the output voltages V1, V2 (V1>V2) of the blocks read in the transfer capacitances 16-1, 16-2, the voltage V0 obtained on the output line 2 is given by:

$$V0 = CT \times hFE \times V1/(CT \times hFE + CH) \quad (3)$$

since the collector current Ic of a transistor is hFE times of the base current Ib. Since hFE of the NPN transistors 17 is usually equal to or higher than 100, the parasite capacitance CH becomes negligible, and the signal readout can be achieved with a gain almost equal to 1.

Then, at a time T8, the pulse to the transfer terminal 4 is shifted to the low level state to terminate the readout operation, whereupon the transfer capacitances 16-1, 16-2 are maintained in the floating state and the output voltage becomes gradually lower.

The rate of decline of the output voltage is represented by:

$$IS/(hFE \times CB)$$

wherein IS is the current of a constant current source 18 provided in the output stage, and CB is the base capacitance of the NPN transistors 17-1, 17-2, so that the output period can be made longer by selecting a small constant current IS.

The foregoing first embodiment employs NPN transistors for the block buffer means, but there may also be employed PNP transistors. In such case the bases are connected to the function circuits while the emitters are connected in common to a power source through a constant current source, and the collectors are grounded, and the output is obtained from the commonly connected emitters. In this configuration, in contrast to the foregoing configuration, the minimum potential of the blocks is output. Also by inverting the polarity of the foregoing embodiment, for example by employing a PNP transistor and an NMOS transistor for each pixel, the charge of a pixel having the minimum charge among all the pixels is output. Such configuration for detecting the minimum pixel charge is effective for instantaneous detection of a dark area, generated instantaneously in an extremely bright field.

As explained in the foregoing, the configuration of the present invention can be advantageously utilized as a detector, as it enables high-speed readout of the pixel block signals without loss.

Figure 6:
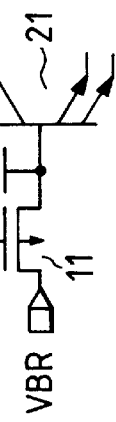
FIG. 6 is a circuit diagram of a photoelectric converting element in an embodiment of the present invention.
Figure 7:
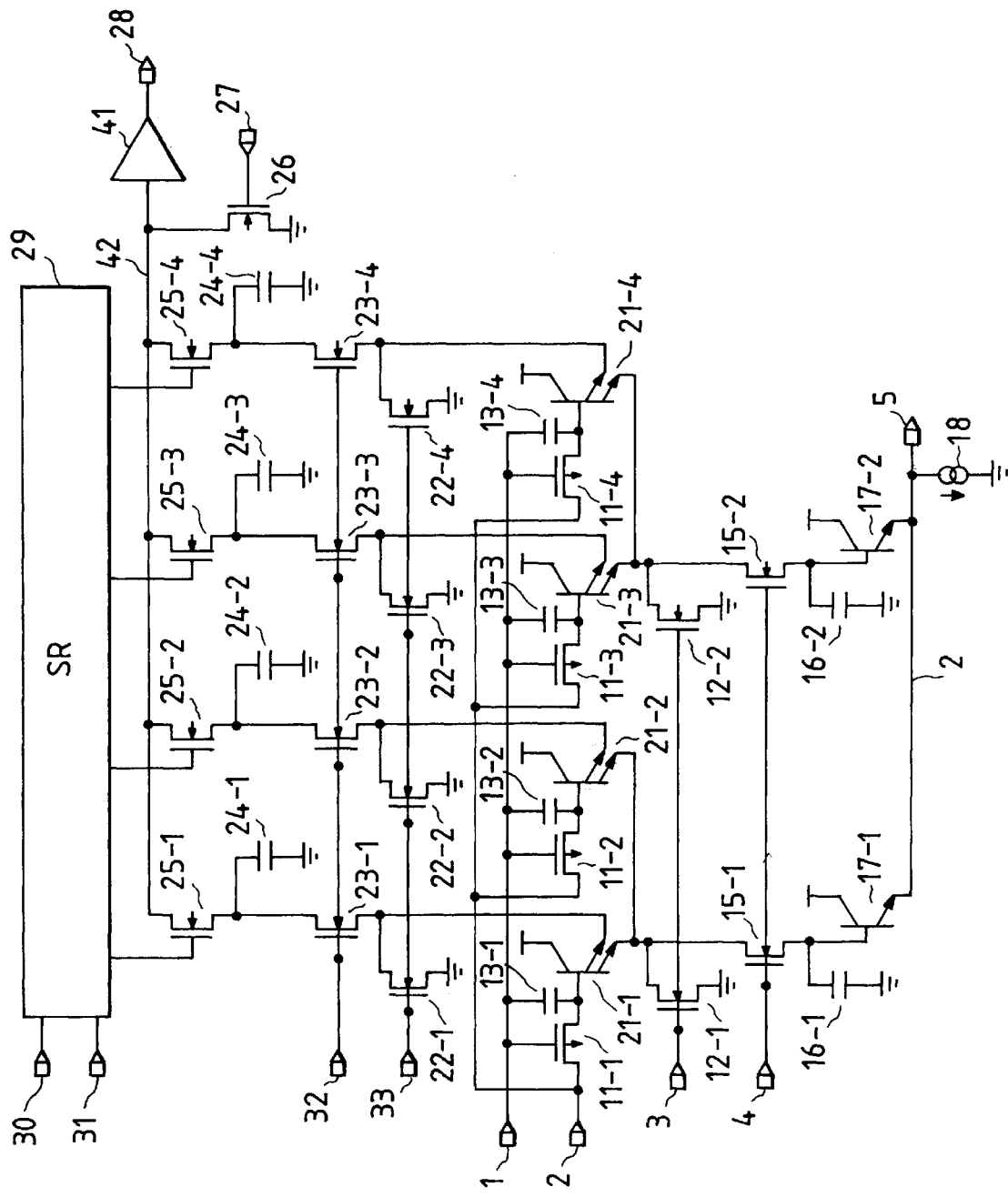
FIG. 7 is a circuit diagram of an embodiment of the present invention.

FIGS. 6 and 7 illustrate a second embodiment of the present invention, wherein components equivalent to those in FIG. 4 are represented by same numbers and will not be explained further. The present embodiment is an improvement on the first embodiment, and is capable of both the block signal readout of the first embodiment and the readout of the signals of all the pixels. The photoelectric conversion element employed in the present embodiment is composed, as shown in FIG. 6, of an NPN transistor 21 with two emitters, a PMOS transistor 11 and capacitance means 13, wherein one of the two emitters is connected with those of other photoelectric conversion elements to constitute a pixel block, thereby outputting the maximum voltage among the pixels constituting the block. And another emitter is connected with a readout circuit as explained in conventional configuration. So that, it is a combination of the conventional configuration shown in FIG. 2 and the first embodiment shown in FIG. 4.

Figure 8:
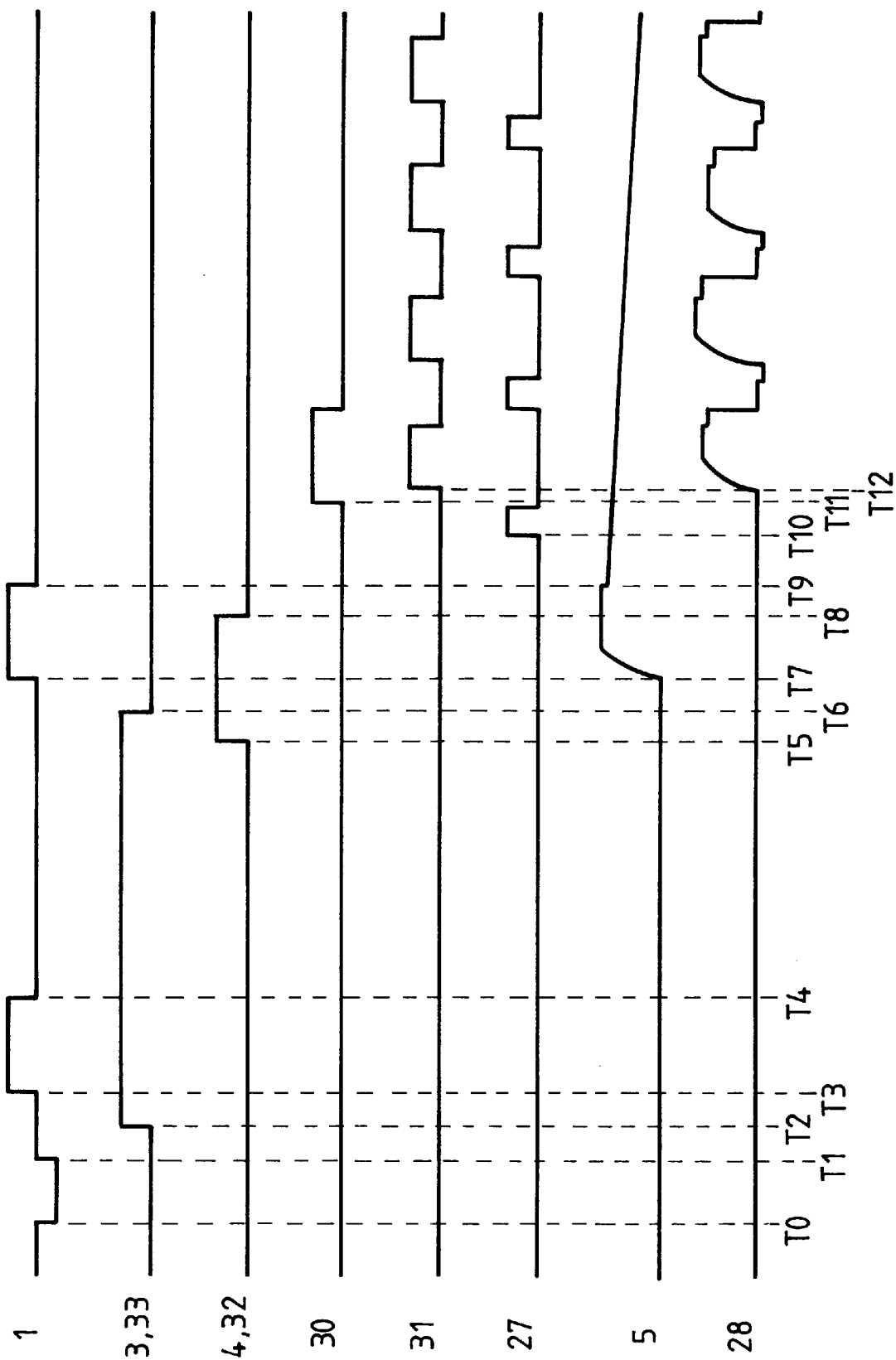
FIG. 8 is a timing chart of an embodiment of the present invention.

The function of the present embodiment will be briefly explained with reference to a timing chart shown in FIG. 8.

At first, at a time T0, a low level pulse is applied to the three-value pulse terminal 1 to effect first resetting of the pixels, and, at a time T1, a middle level pulse is applied to the three-value pulse terminal 1 to render the PMOS transistors 11 non-conductive. Then, at a time T2, high level pulses are applied to the reset terminal 3 and the terminal 33 to reset the two emitters of the NPN transistor 21 of each pixel to a reset potential (ground in the illustrated configuration). At a subsequent time T3, a high level pulse is applied to the three-value pulse terminal 1 to effect second resetting through the NMOS transistors 12, 22. At a time T4, the pulse to the three-value pulse terminal 1 is lowered to the middle level to terminate the resetting operation and to initiate the accumulation of the photoelectrically converted charges in the bases of the NPN transistors 21.

Then, at a time T5 after a predetermined accumulation time, high level pulses are applied to the transfer terminals 32, 4 to render the NMOS transistors 23-1 to 23-4 and 15-1, 15-2 conductive whereby the first emitters of the pixels are connected to the capacitances 24-1 to 24-4 while the second emitters are connected to the capacitances 16-1, 16-2, so that the emitters and the capacitances of the pixels are reset to the ground level through the NMOS transistors 12, 22. Then, at a time T7, a high level pulse is applied to the three-value pulse terminal 1 to transfer the signals of the pixels respectively to the capacitances 24-1 to 24-4 and the highest voltages of the pixels 1, 2 and of the pixels 3, 4 respectively to the capacitances 16-1, 16-2 whereby the highest voltage of the capacitances 16-1, 16-2 is supplied to the output line 2. Subsequently, at a time T8, the pulses at the transfer terminals 32, 4 are shifted to the low level whereby the readout operation is terminated.

Then, at a time T9, the pulse to the three-value pulse terminal 1 is shifted down to the low level, and, at a time T10, a high level pulse is applied to the reset terminal 27 to reset the output line 42. Then, a start pulse 30 and scanning pulses 31 are supplied to the scanning circuit 29 respectively at times T11 and T12 whereby the signals of the pixels are time-sequentially read out to the output terminal 28, in synchronization with clock signals.

In the present embodiment, the signal of the blocks is read before the readout of the signal of each pixel, but the following drive is also possible for example in the application for a detector. The operations of the device can be significantly simplified by at first reading the block signal, then discriminating whether the block signal is larger (or smaller) than a predetermined value, and, if larger (or smaller), reading the signals of every pixels, but, if smaller (or larger), terminating the each signal readout from the pixels because the signal level of the pixels is too low. In this manner it is possible to reduce the process time and to significantly reduce the power consumption.

Figure 9:
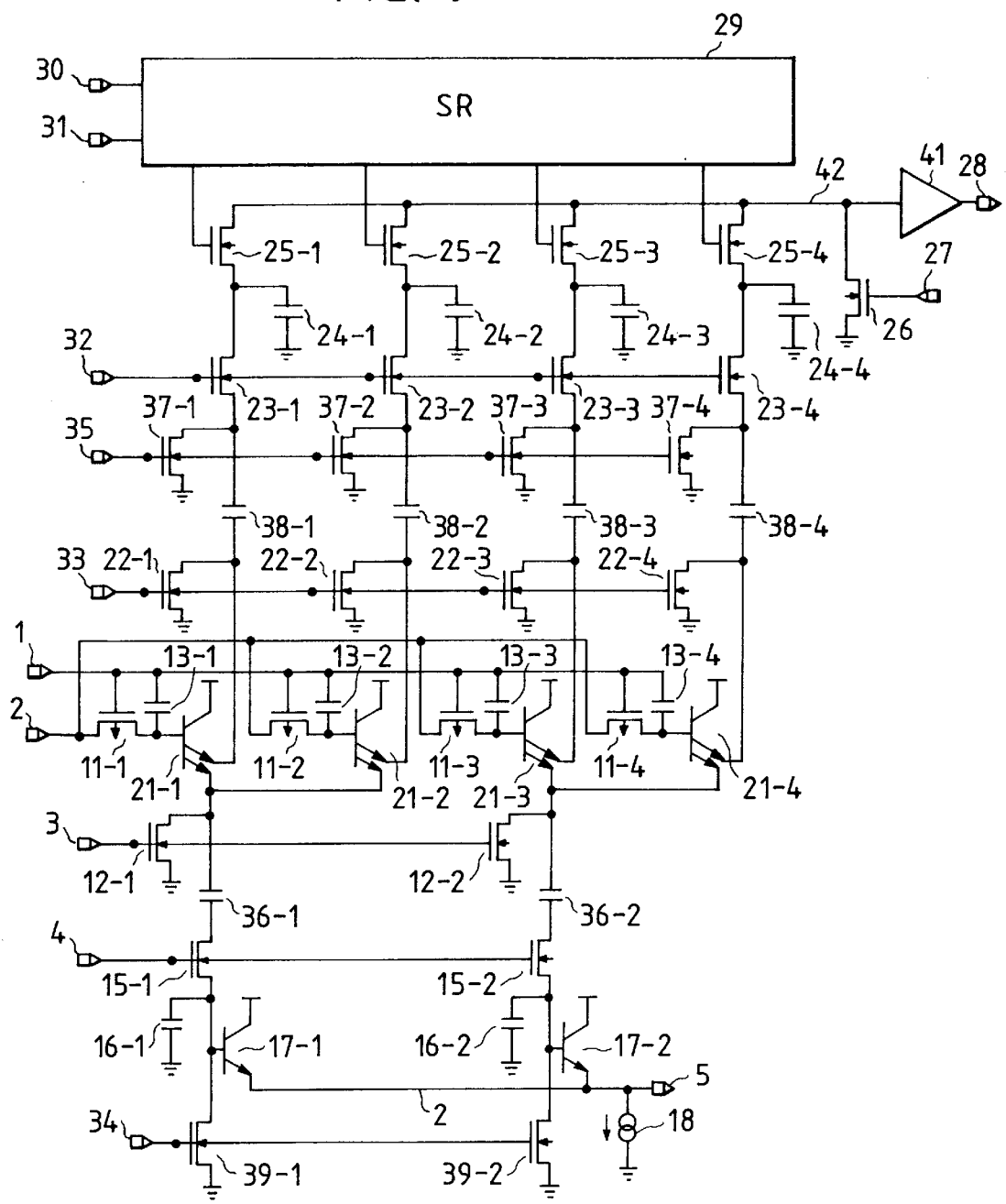
FIG. 9 is a circuit diagram of an embodiment of the present invention.
Figure 10:
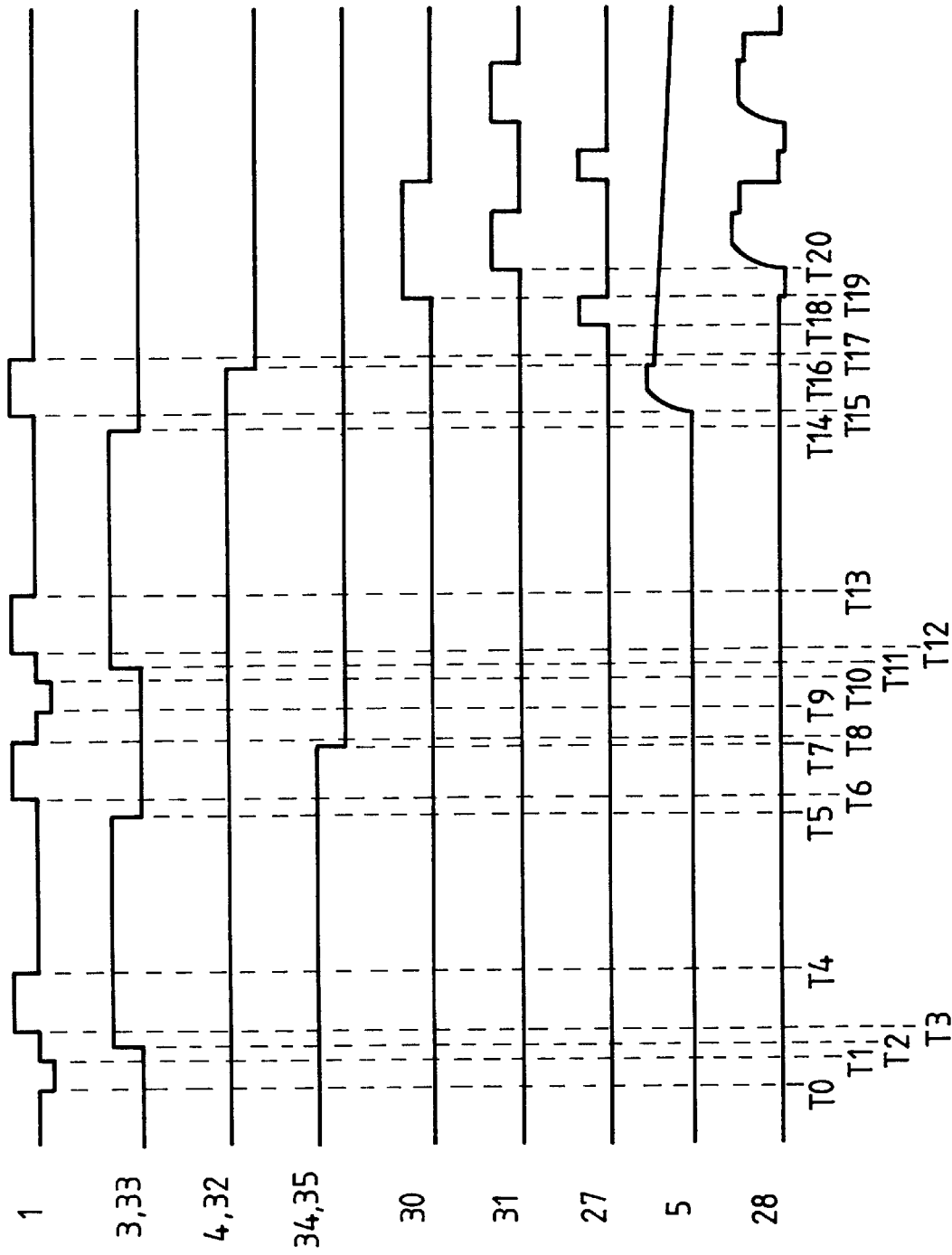
FIG. 10 is a timing chart of an embodiment of the present invention.

FIG. 9 shows a third embodiment of the present invention, wherein components equivalent to those in FIG. 4 are represented by same numbers and will not be explained further. In addition to the second embodiment, the present embodiment is provided, serially to the vertical output lines, with capacitance means 38-1 to 38-4 and capacitance means 36-1, 36-2 to effect clamping operations for the signals, thereby eliminating FPN (fixed pattern noise) and random noises, and also eliminating external light components other than the reflected light, in case of irradiating an object with light from a light source such as an LED and taking the reflected light. Such functions will be briefly explained in the following with reference to a timing chart shown in FIG. 10.

At first, in a period from a time T0 to T7, there are executed first and second resetting of the pixels, a first accumulating operation and a signal readout operation. Then at the time T7 immediately before the end of the readout operation, pulses at the reset terminals 34, 35 are shifted down. Then, at a time T11, high level pulses are supplied to the reset terminals 3, 33 to reset the emitters of the pixels, whereby retaining transfer capacitances 24-1 to 24-4 and transfer capacitances 32-1, 32-2 are shifted to the negative side by the read signals, through the coupling capacitances 38-1 to 38-4 and the coupling capacitances 36-1, 36-2. Subsequently, in a period from a time T12 to T15, there are executed first and second resetting of the pixels and a second accumulating operation, and a readout operation is executed at the time T15, whereupon difference signals from the signals read in the first accumulating operation are supplied to the transfer capacitances 24-1 to 24-4 and 16-1, 16-2. After the time T15, the maximum value of the pixel blocks is supplied to the output terminal 5, and, on the other hand, the scanning circuit 29 is driven after a time T19 to time-sequentially output the signals of every pixels from the output terminal 28.

As an output corresponding to the dark signal can be obtained by selecting an extremely short accumulation time for the first accumulation, so that FPN (fixed pattern noise), which is a drawback of the amplifying solid-state image pickup device, can be eliminated by obtaining the difference between the above-mentioned output and the second output. Also by selecting a same accumulation time for the first and second accumulations and irradiating the object with the light from the light source such as an LED during the second accumulation time, the reflected image of the object can be precisely read out even in a bright indoor situation, and such ability is suitable particularly for a detector.

Also in the present embodiment, it is possible to reduce the signal readout time and the power consumption by detecting the pixel block signal and reading the individual pixel signals only when necessary, as already explained in the second embodiment. Also in the present embodiment, the block signals and the individual pixel signals are also output through the clamping circuits, but such clamping circuits may naturally be dispensed with.

Figure 11:
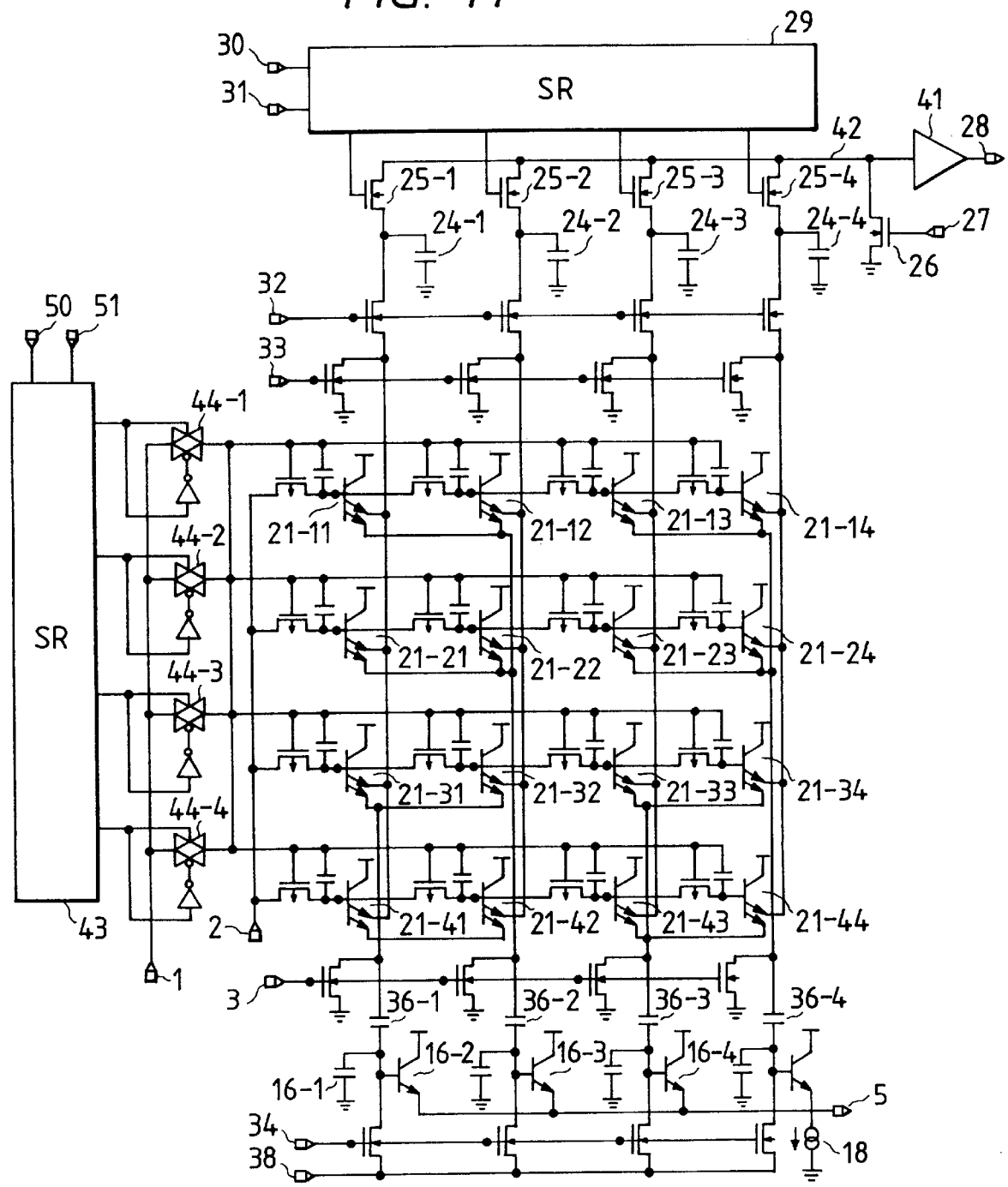
FIG. 11 is a circuit diagram of an embodiment of the present invention.

FIG. 11 shows a fourth embodiment of the present invention, wherein components equivalent to those in FIG. 4 are represented by same numbers and will not be explained further. In comparison with the third embodiment, the present embodiment provides an area sensor consisting of a two-dimensional array of the photoelectric conversion elements.

In FIG. 11, each block is composed of two pixels in the vertical direction and two pixels in the horizontal direction, and the outputs of the blocks are transferred to transfer capacitances 24-1 to 24-4, while the pixel signals are driven by the output of a vertical shift register. The present embodiment, providing a larger image pickup area than in the third embodiment, can achieve more precise detecting operation.

Referring to FIG. 11, in response to a start pulse 50 and vertical scanning pulses 51, a vertical scanning shift register 43 sends horizontal scanning pulses in succession to horizontal lines, thereby controlling switches 44-1 to 44-4 including inverters. The three-value pulse entered from the three-value pulse terminal 1 is turned on and off by the switches 44 to at first activate the pixels of the 1st and 2nd horizontal scanning lines, composed of the NPN transistors 21-11 to 21-14 and 21-21 to 21-24, whereby the signals of these pixels are transferred to the transfer capacitances 24-1 to 24-4 and are output in succession to the output terminal 28 through the output line 42. On the other hand, in the block unit, the charges obtained from the NPN transistors 21-11, 21-12, 21-21 and 21-22 are transferred to a coupling capacitance 36-2 while those obtained from the NPN transistors 21-13, 21-14, 21-23 and 21-24 are transferred to a coupling capacitance 36-4 and then transferred to transfer capacitances 16-2, 16-4, whereby a voltage corresponding to the maximum charge in the blocks are obtained at the output terminal 5.

In the present embodiment, each block is composed of 2×2 pixels, but there may employed a larger number of pixels for constituting a block. In comparison with conventional readout of each pixel, a larger number of pixels improves the S/N ratio of the output at the output terminal 5 and enables image readout at a higher speed, thereby enabling image pickup with a higher precision, in combination with the readout of the pixel signals.

In the foregoing embodiments, the signal of each block is detected with a peak signal, obtained from NPN transistors, but it is also possible to detect a bottom signal with PNP transistors, and both may be employed in combination for achieving finer detection.

The foregoing embodiments have all been constructed with bipolar photoelectric conversion elements, but similar effects can be obtained also with XY-addressable photoelectric conversion elements such as CMD, AMI or FGA.

As explained in the foregoing, the 1st to 4th embodiments have the following technological advantages.

Enabling high-speed readout of the pixel block signal without loss, are advantageously applicable to detectors. It is also possible to significantly simplify the operation, in certain applications such as for detector, to at first read out the block signal, then to discriminate whether such block signal is larger (or smaller) than a predetermined value, and, if it is larger (or smaller), to read out the pixel signals in succession, but, if it is smaller (or larger), to terminate the signal readout as the level of the pixel signals is too low. In this manner it is rendered possible to reduce the process time and the power consumption. Also, in the utilization of the block signal, there can be obtained an output corresponding to a dark area by selecting a very short first accumulation time, and the FPN (fixed pattern noise), which is a drawback of the amplifying solid-state image pickup device, can be eliminated by obtaining the difference between the above-mentioned output and the second output. Also by selecting a same accumulation time for the first and second accumulating operations and irradiating the object with the light from a light source such as an LED in the course of the second accumulating time, the reflected image of the object can be read out in highly precise manner even in a bright indoor situation. Such function can be advantageously utilized particularly in a detector.

In the following the function and effect of a 5th embodiment will be briefly explained with reference to FIG. 12, wherein shown are unit pixels 51-1 to 51-8; transfer means 50-1 to 50-8 for retaining the pixel signals of the unit pixels 51-1 to 51-8 in accumulating capacitances and then serially outputting the pixel signals to an output line 55; pre-process means 52-1 to 52-8 connected to the unit pixels 51-1 to 51-8 for effecting a pre-process; buffer means 53-1 to 53-8 for buffering the signals from the pro-process means; and switching means 54-1 to 54-8 connecting the transfer means 50-1 to 50-8 with the buffer means 53-1 to 53-8. The buffer means 53-1 to 53-8 may be dispensed with if unnecessary.

In the present embodiment, the signals of the unit pixels 51-1 to 51-8 are transferred to the transfer means 50-1 to 50-8 for retaining the signal of each pixel, and are output to a terminal 57 through an output line 55 and an output circuit 56. Also they are subjected to a suitable pre-processing in the pre-process means 52-1 to 52-8, then transferred to the transfer means 50-1 to 50-8 through the buffer means 53-1 to 53-8, and released to the terminal 57. Naturally the unprocessed signals and the pre-processed signals have to be released in different periods. It is also possible to form the unprocessed signals and the pre-processed signals into blocks in the transfer means 50-1 to 50-8 and to output these signals by serial transfer after mixing thereof.

Figure 2:
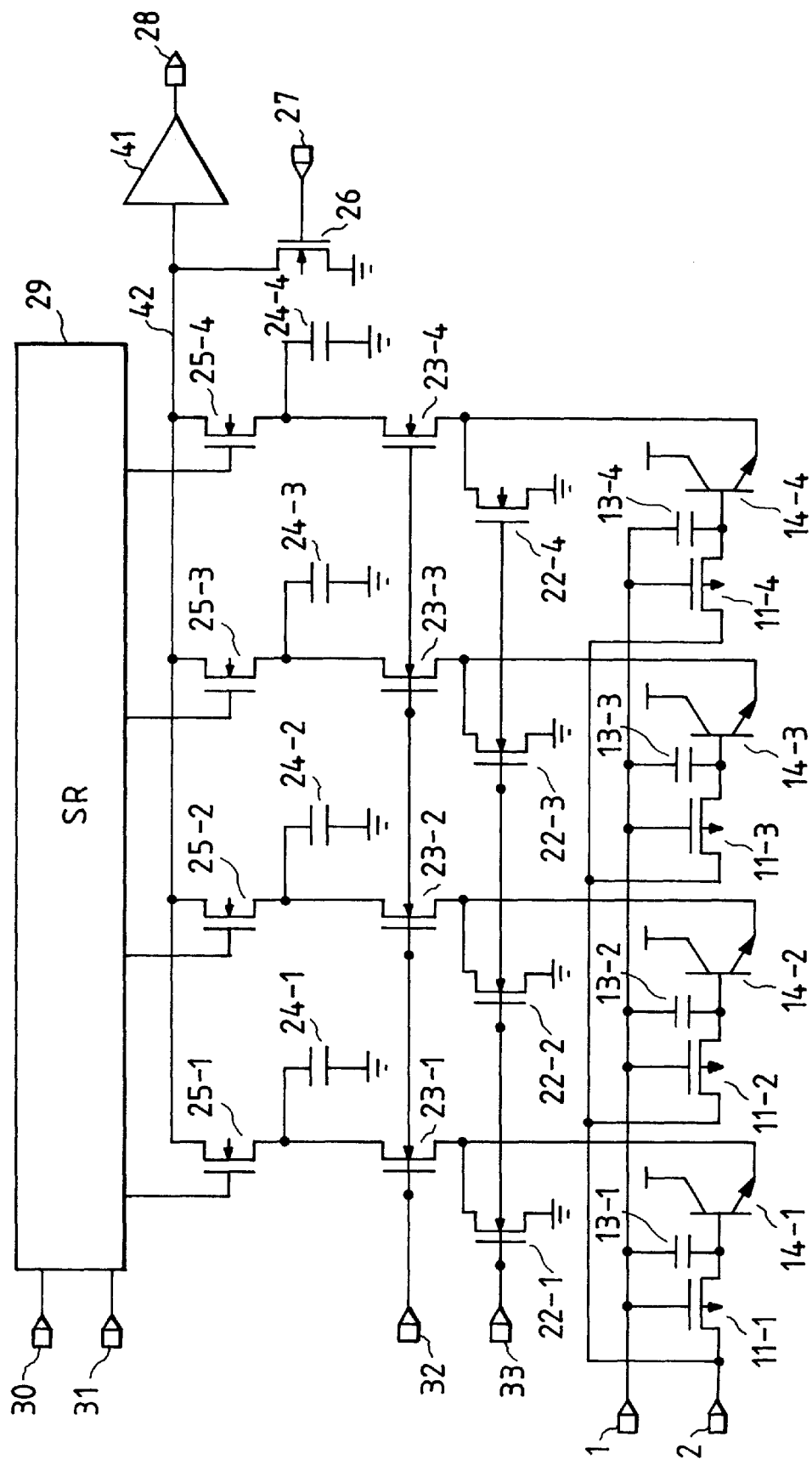
FIG. 2 is a circuit diagram of a conventional solid-state image pickup device.

The transfer means 50-1 to 50-8 can be realized, for example, by the accumulating capacitances 24-1 to 24-4, the switch means 25-1 to 25-4 and the scanning circuit 29 shown in FIG. 2, and the pre-process circuit can be composed of an FPN (fixed pattern noise) elimination circuit utilizing a clamping circuit to be explained later.

Figure 12:
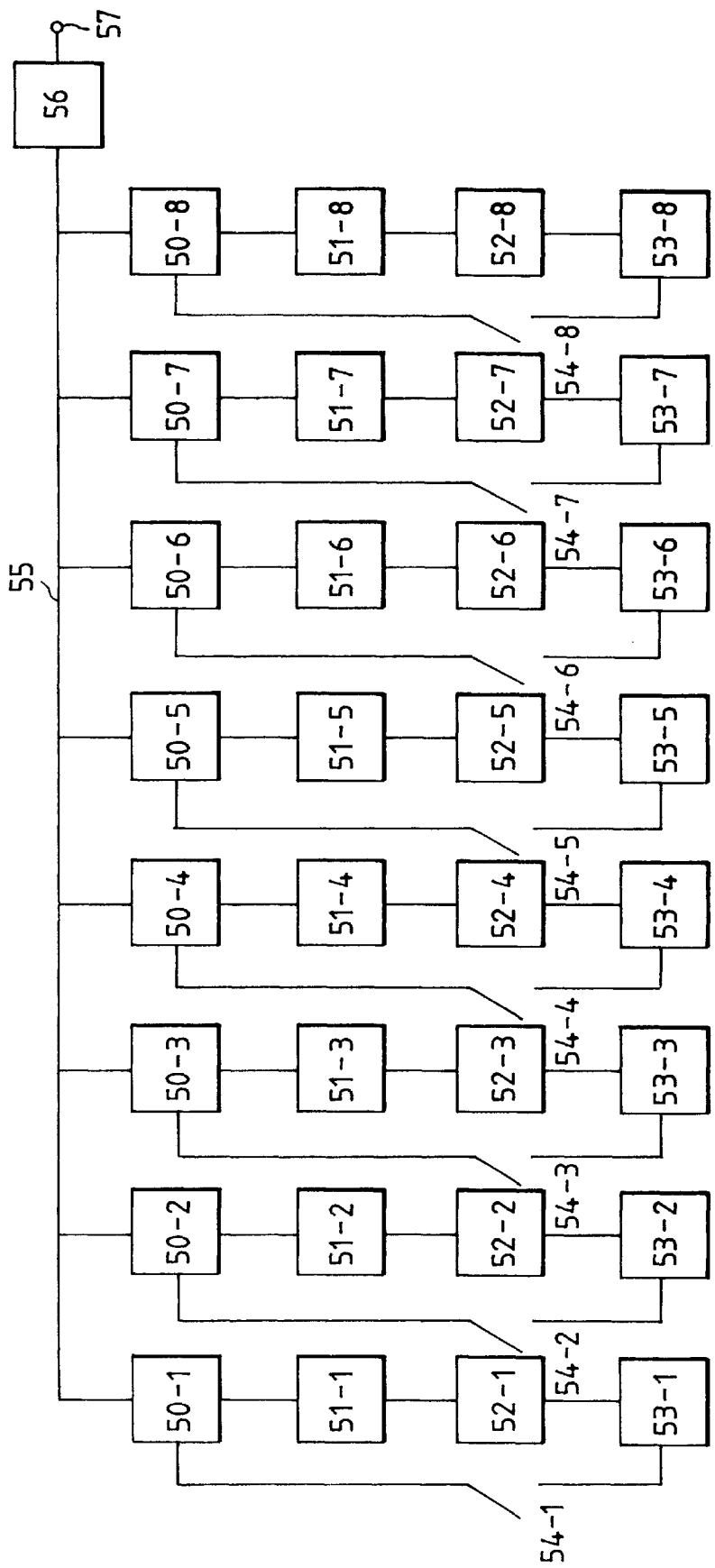
FIG. 12 is a block diagram showing the working principle of the present invention.
Figure 13:
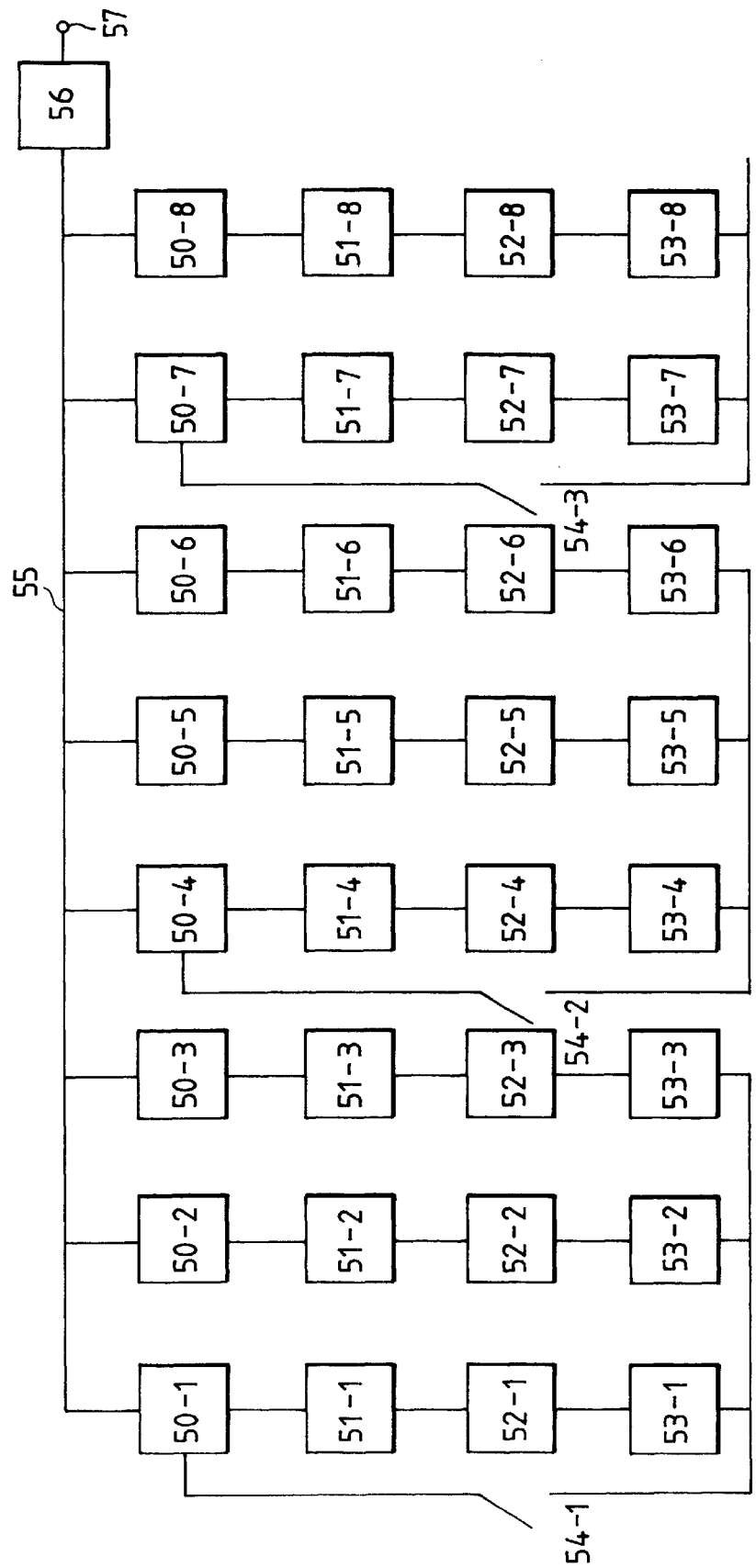
FIG. 13 is a block diagram showing another working principle of the present invention.

Also in a configuration shown in FIG. 13, in which components same as those in FIG. 12 are represented by same numbers, the signals pro-processed in the pre-process means 52-1 to 52-8 are buffered by the buffer means 53-1 to 53-8, and plural columns are formed into a block, of which signal is transferred to retain/transfer means. This configuration allows to reduce the amount of pixel signals and to significantly reduce the cycle time, and the retain/transfer circuits and the output circuit can be used in common for the unprocessed signals, so that a major increase in the chip size is not required. It is therefore possible to provide a high-speed and inexpensive solid-state image pickup device of a low power consumption by normally reading out the block signal and effecting the detecting operation based on this block signal, and reading out the signals of every pixels only when necessary. Such function will be explained in detail in the following embodiment.

Figure 14:
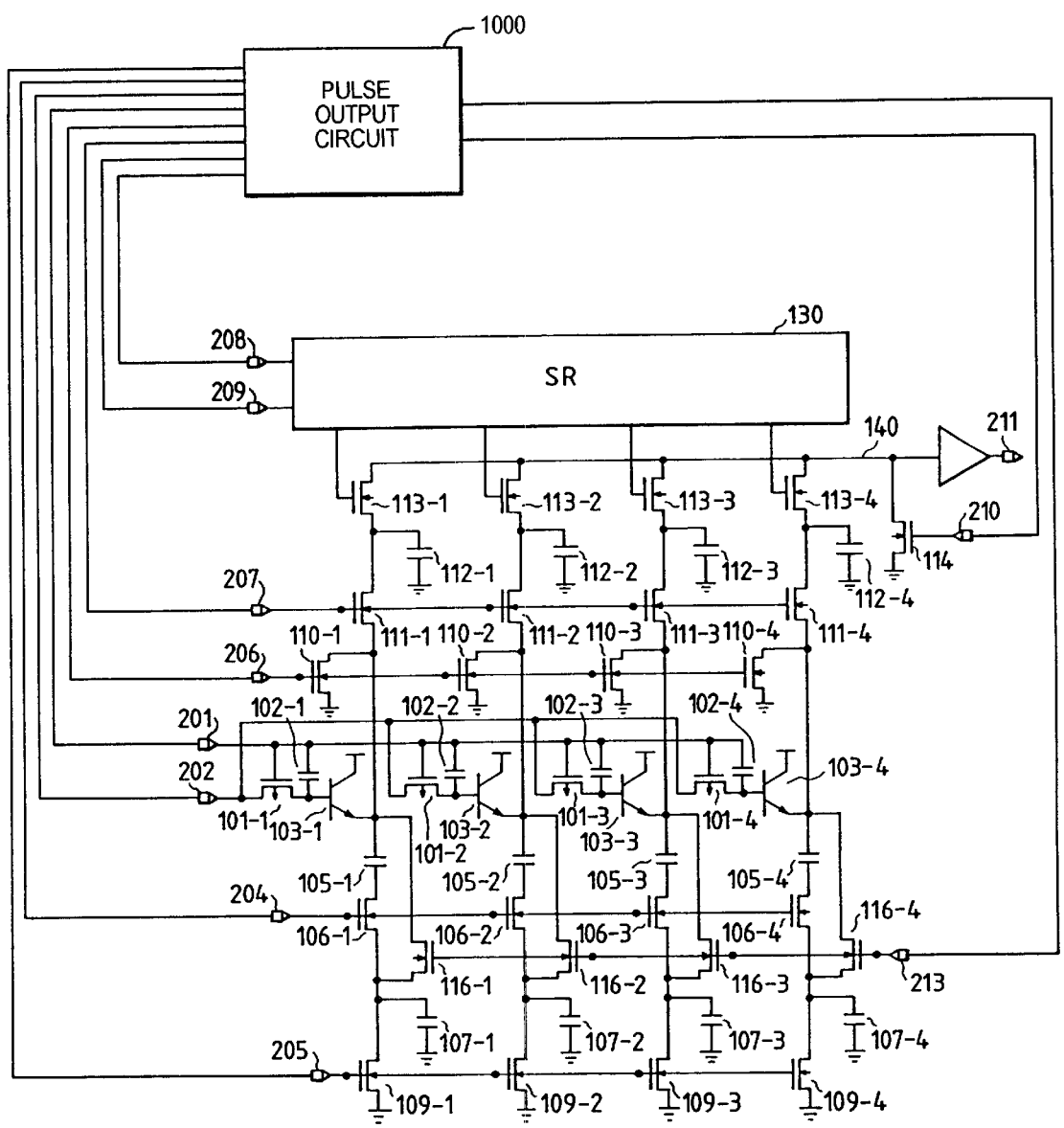
FIG. 14 is a circuit diagram of an embodiment of the present invention.

FIG. 14 shows a 6th embodiment of the present invention, employing four bipolar photoelectric conversion elements shown in FIG. 1, arranged in a linear array. In FIG. 14, components equivalent to those in FIG. 2 are represented by same numbers. In addition, the present embodiment is provided, as explained in the foregoing embodiment shown in FIG. 12, with pre-processing means composed of coupling capacitances 105-1 to 105-4 and NMOS transistors 106-1 to 106-4; buffer means composed of buffer capacitances 107-1 to 107-4 and NMOS transistors 109-1 to 109-4; and switch means composed of NMOS transistors 116-1 to 116-4.

In the following, the function of the present embodiment will be explained with reference to a timing chart shown in FIG. 15. At first high level pulses are supplied to terminals 205, 204 and 207 to render the NMOS transistors 109-1 to 109-4, 106-1 to 106-4 and 111-1 to 111-4 conductive.

At a time T0, a low level pulse is supplied to a terminal 201 to render the PMOS transistors 101-1 to 101-4 conductive whereby the base areas of the photoelectric conversion elements are reset to a voltage given to a terminal 202 (first resetting). Then the pulse to the terminal 201 is shifted to the middle level to reduce the gate-source voltage VGS of the PMOS transistors 101-1 to 101-4 to a value not exceeding the threshold value Vth thereof, whereby these PMOS transistors are rendered non-conductive and the first resetting operation is completed.

Then, at a time T1, a high level pulse is applied to a terminal 206 to render the NMOS transistors 110-1 to 110-4 conductive, whereby the emitter of the NPN transistors of the pixels is reset to a reset potential (ground in the illustrated configuration).

Then, at a time T2, a high level pulse is applied to the terminal 201 to elevate the base potential of the NPN transistors by the capacitative coupling through the capacitances 102-1 to 102-4 thereby generating a forward bias between the bases and the emitters, while the PMOS transistors 101-1 to 101-4 are retained in the non-conductive state, whereby the NPN transistors 103-1 to 103-4 effect an emitter follower operation. As a result the holes on the base areas in the floating state effect photorecombination and the base potential is reset (second resetting operation).

At a time T3 after this resetting operation, the pulse to the terminal 201 is shifted down to the middle level to shift the base potentials of the pixels to the negative side, whereby an inverse bias state is generated between the bases and the emitters and an accumulating operation is thereby initiated (first accumulating operation).

At a time T4 after a predetermined accumulation time, the pulse to the terminal 206 is shifted down to the low level state to render the NMOS transistors 110-1 to 110-4 non-conductive, whereby the emitters of the pixel transistors 103-1 to 103-4 and the capacitances 112-1 to 112-4 are shifted to a floating state.

Then, at a time T5, a high level pulse is applied to a terminal 201 to shift the base potentials of the pixels to the positive side through the capacitances 102-1 to 102-4, thereby generating a forward bias between the bases and emitters of the NPN transistors 103-1 to 103-4 of the pixels. Consequently the signals obtained by photoelectric conversion in the respective pixels and accumulated in the base areas are respectively transferred to the accumulation capacitances 112-1 to 112-4 and the coupling capacitances 105-1 to 105-4.

Then, at a time T6 immediately before the completion of the readout operation, the pulse to the terminal 205 is shifted down to render the NMOS transistors 109-1 to 109-4 non-conductive.

Subsequently, at a time T7, the pulse to the terminal 201 is shifted down to turn off the NPN transistors 103-1 to 103-4 through the capacitances 102-1 to 102-4 whereby the readout operation is terminated.

Then, at a time T8, a high level pulse is again applied to the terminal 206 to reset the emitters of the pixel NPN transistors 103-1 to 103-4 to the reset potential (ground in the illustrated configuration), whereby the voltages of the buffer capacitances 107-1 to 107-4 are shifted to the negative side by the capacitative coupling of the coupling capacitances 105-1 to 105-4. There stands the following relationship between the signal $V_R$ transferred to the coupling capacitances 105-1 to 105-4 and the signal $V_R'$ after the above-mentioned negative shifting:

$$V_R' = -C_C \times V_R / (C_C + C_T + C_S) \quad (4)$$

wherein $C_C$: capacity of the coupling capacitances 105-1 to 105-4;

$C_T$: capacity of the buffer capacitances 107-1 to 107-4; and $C_S$: parasite capacity including the gate capacitance of the NMOS transistors 106-1 to 106-4.

As the NMOS transistors 110-1 to 110-4 are turned on, the signals transferred to the NMOS transistors 112-1 to 112-4 are also reset.

Then, in a period from a time T9 to T14, there are conducted operations similar to those in the period from T0 to T4, except that the NMOS transistors 109-1 to 109-4 are turned off, whereby the photoelectric conversion elements are reset and the photocarriers are accumulated (second accumulating operation). Then, at a time T14, there is executed a signal readout operation to provide signal voltages, added to the voltages obtained according to the equation (4). As a result, difference signals between the photoelectric conversion signals obtained in the first accumulation time and those obtained in the second accumulation time are retained in the buffer capacitances 107-1 to 107-4.

Then, at a time T16, a high level pulse is applied to the terminal 206 to reset the accumulation capacitances 112-1 to 112-4 again, and, at a time T17, a high level pulse is applied to a terminal 213 to render the NMOS transistors 116-1 to 116-4 conductive, whereby the signals in the buffer capacitances 107-1 to 107-4 are transferred to the accumulation capacitances 112-1 to 112-4.

Then at a time T18, the terminals 204, 207 are shifted to the low level state to turn off the NMOS transistors 106-1 to 106-4 and 111-1 to 111-4, whereby the NMOS transistors 116-1 to 116-4 are rendered non-conductive.

Then, starting from a time T19, a scanning circuit 130 is activated with the resetting of an output line 140, thereby serially transferring the signals of the accumulation capacitances 112-1 to 112-4 to an output terminal 211, and the operations of a series are thus completed. It is also possible to eliminate the FPN (fixed pattern noise) in these operations, by selecting a very short first accumulation time to obtain a signal corresponding to the dark area, and calculating the difference of the above-mentioned signal and the signal obtained in the second accumulation.

In the arrangement shown in FIG. 14, the pulses to be applied to the respective terminals are supplied from a pulse output circuit 1000.

Also by selecting a same accumulation time in the first and second accumulating operations and irradiating the object with the light from a light source such as an LED in the course of the second accumulation time, there can be eliminated the component of the external light even in an outdoor situation, whereby an exact object detection can be achieved.

Figure 15:
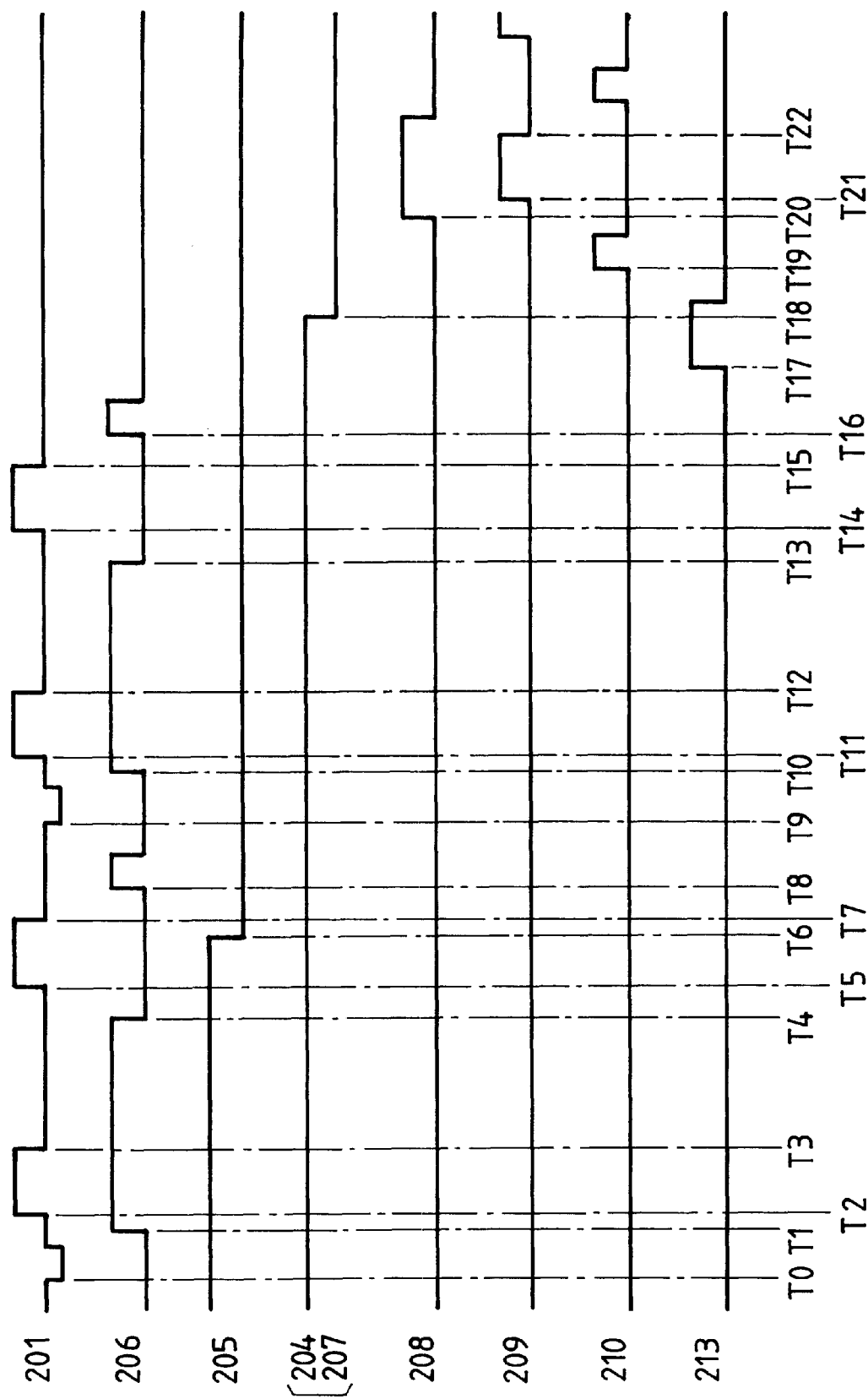
FIG. 15 is a timing chart showing the functions of the embodiments shown in FIGS. 14, 17 and 18.
Figure 16:
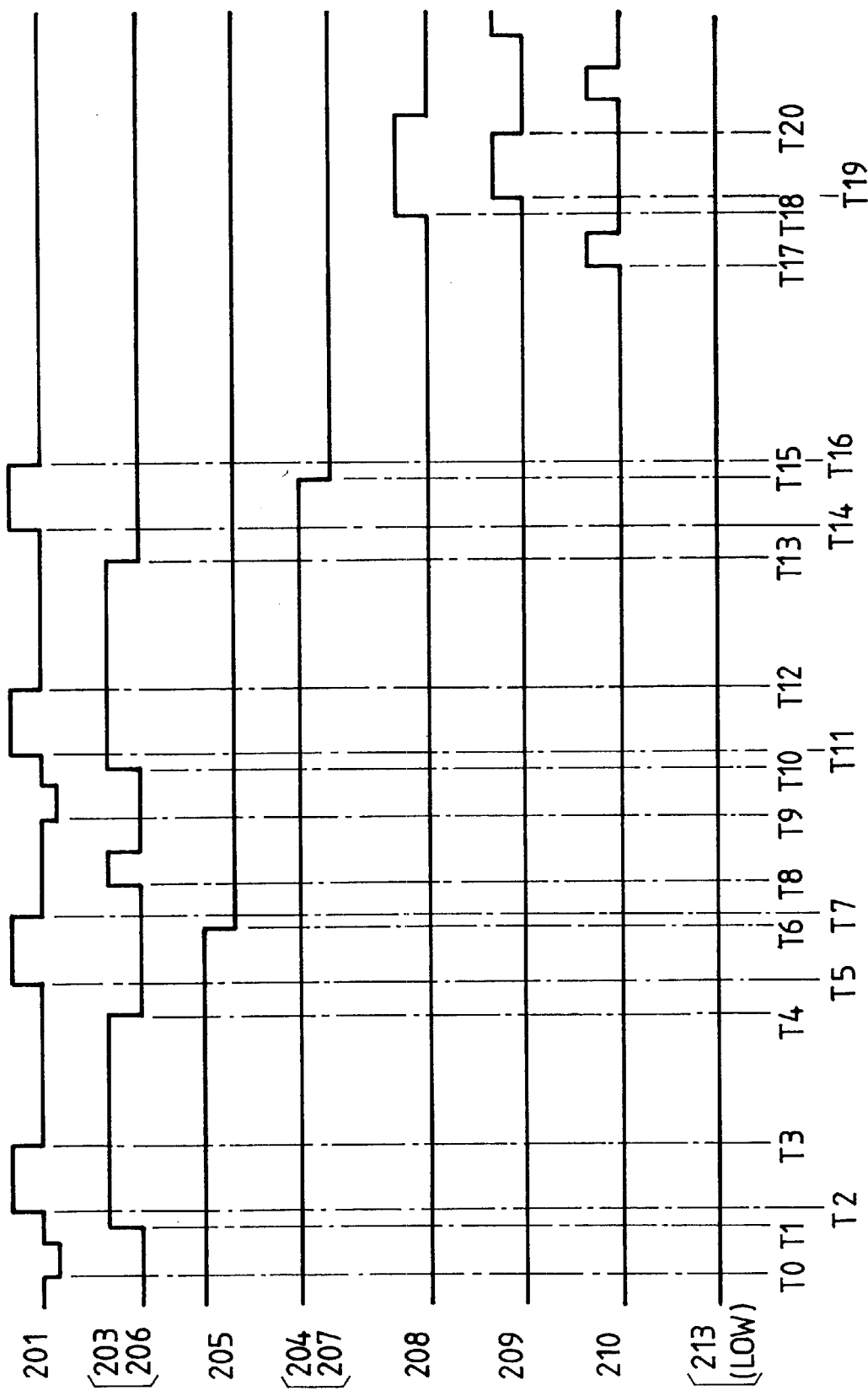
FIG. 16 is a timing chart showing other functions of the embodiments shown in FIGS. 14, 17 and 18.

In the foregoing there has been explained the output of the pre-processed signals, but the unprocessed signals may also be obtained according to a timing chart shown in FIG. 16. The operations shown in FIG. 16, corresponding to a partial modification of those in FIG. 15, effect two accumulations while maintaining the terminal 213 at the low level state even at the time T17 to finally provide the signals obtained in the second accumulation, so that the period from T0 to T9 may be totally dispensed with.

In FIG. 16, the terminal 213 is always maintained at the low level state, whereby the NMOS transistors 115-1 to 115-4 are always in the non-conductive state. Consequently the calculation in the clamping circuits does not at all affect the accumulation capacitances 112-1 to 112-4, so that, in the readout operation, the pixel signals are directly read out to the accumulation capacitances 112-1 to 112-4 as in the conventional configuration, and they are not reset but are serially output by the scanning circuit 130. Such direct readout of the sensor signals is effective for improving the detecting sensitivity, for example in case of detecting an object of relatively low luminance, as in an indoor situation, since the clamping process reduces the output as represented by the equation (4).

Figure 17:
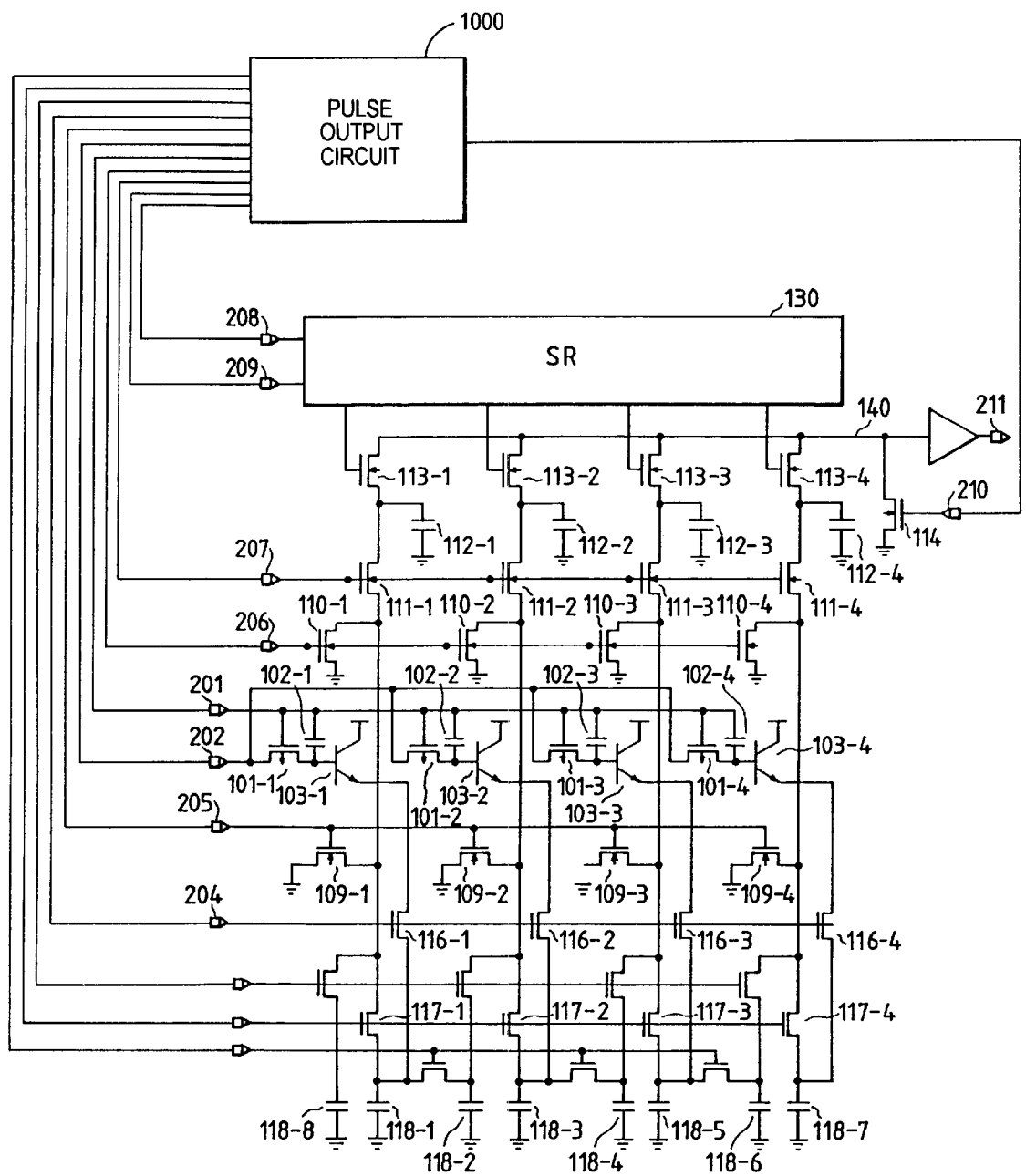
FIG. 17 is a circuit diagram of an embodiment of the present invention.

In the configuration shown in FIG. 14, the pre-processing circuit is composed of a difference calculating circuit utilizing a clamping circuit, but it is also possible, as shown in FIG. 17, to effect signal averaging among the adjacent pixels as the pre-processing, by providing retaining capacitances 118-1 to 118-8, grouped by two and connected respectively to the vertical output lines through switch means 117-1 to 117-4, also providing switch means for connecting the retaining capacitances between the adjacent pixels and connecting the outputs of these switch means to the emitters of the NPN transistors 103-1 to 103-4 through transfer switches 116-1 to 116-4.

In the arrangement shown in FIG. 17, pulses to be applied to the respective terminals are supplied from a pulse output circuit 1000.

Figure 18:
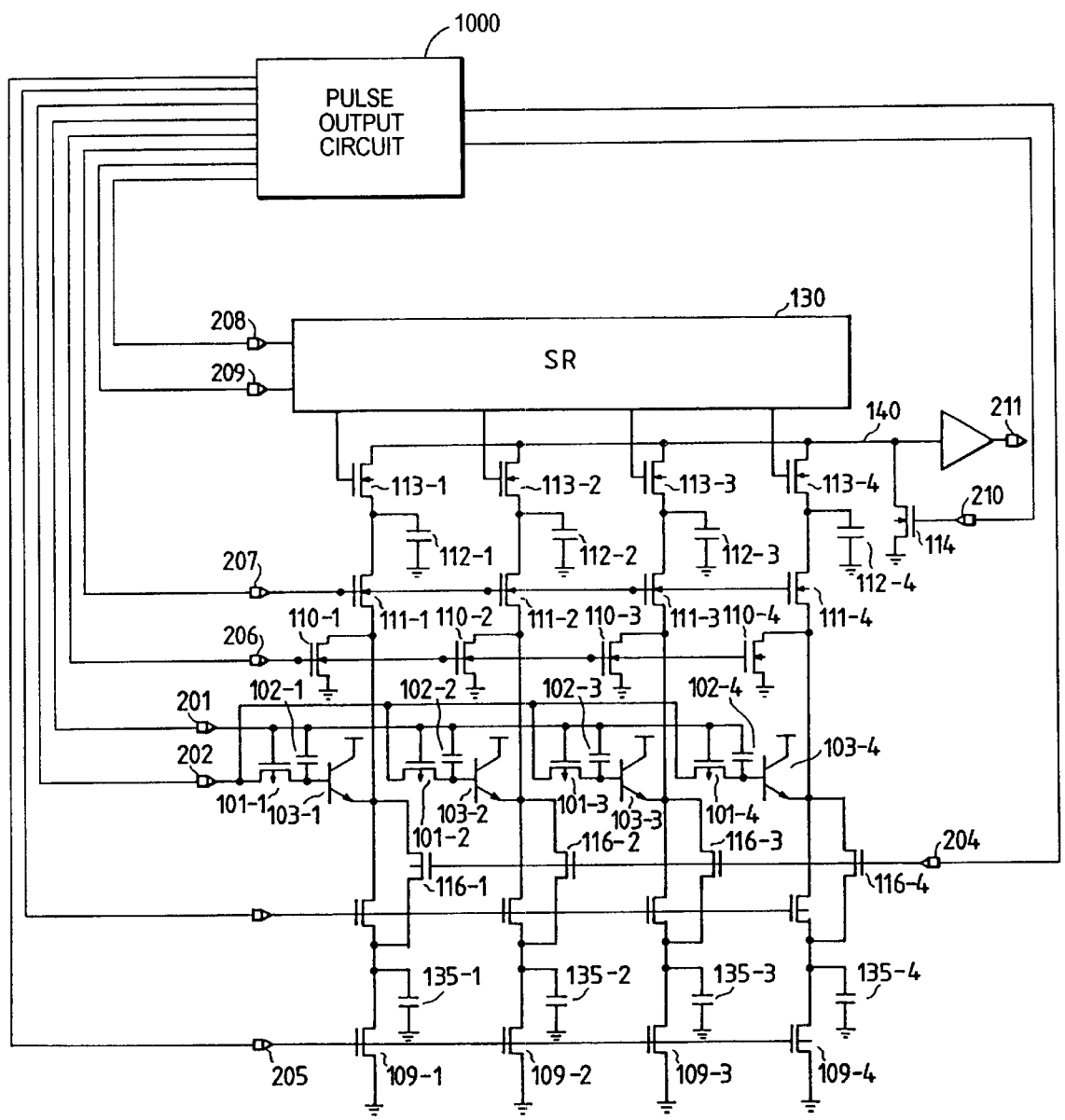
FIG. 18 is a circuit diagram of an embodiment of the present invention.

It is also possible to serially read the signals of different accumulation periods, as shown in FIG. 18, into the capacitances 112-1 to 112-4 and 135-1 to 135-4. Specifically, at first, the signals of an accumulation period is read into the capacitances 112-1 to 112-4 and the signals of another accumulation period is read into the capacitances 135-1 to 135-4. After the signals retained in the capacitances 112-1 to 112-4 are serially read out the output line 140, the signals in the capacitances 135-1 to 135-4 are transferred to the to capacitances 112-1 to 112-4 and output to the line 140 in the same manner. Also by arranging the pixels in a two-dimensional array in the present embodiment, it is rendered possible to retain the maximum signals of the pixels in the respective vertical columns in the capacitances 135-1 to 135-4 and to output these signals at a timing different from that of output of the pixel signals.

In the arrangement shown in FIG. 18, pulses to be applied to the respective terminals are supplied from a pulse output circuit 1000.

Also the pre-processing circuit may be composed of a calculation circuit utilizing an operational amplifier.

Figure 19:
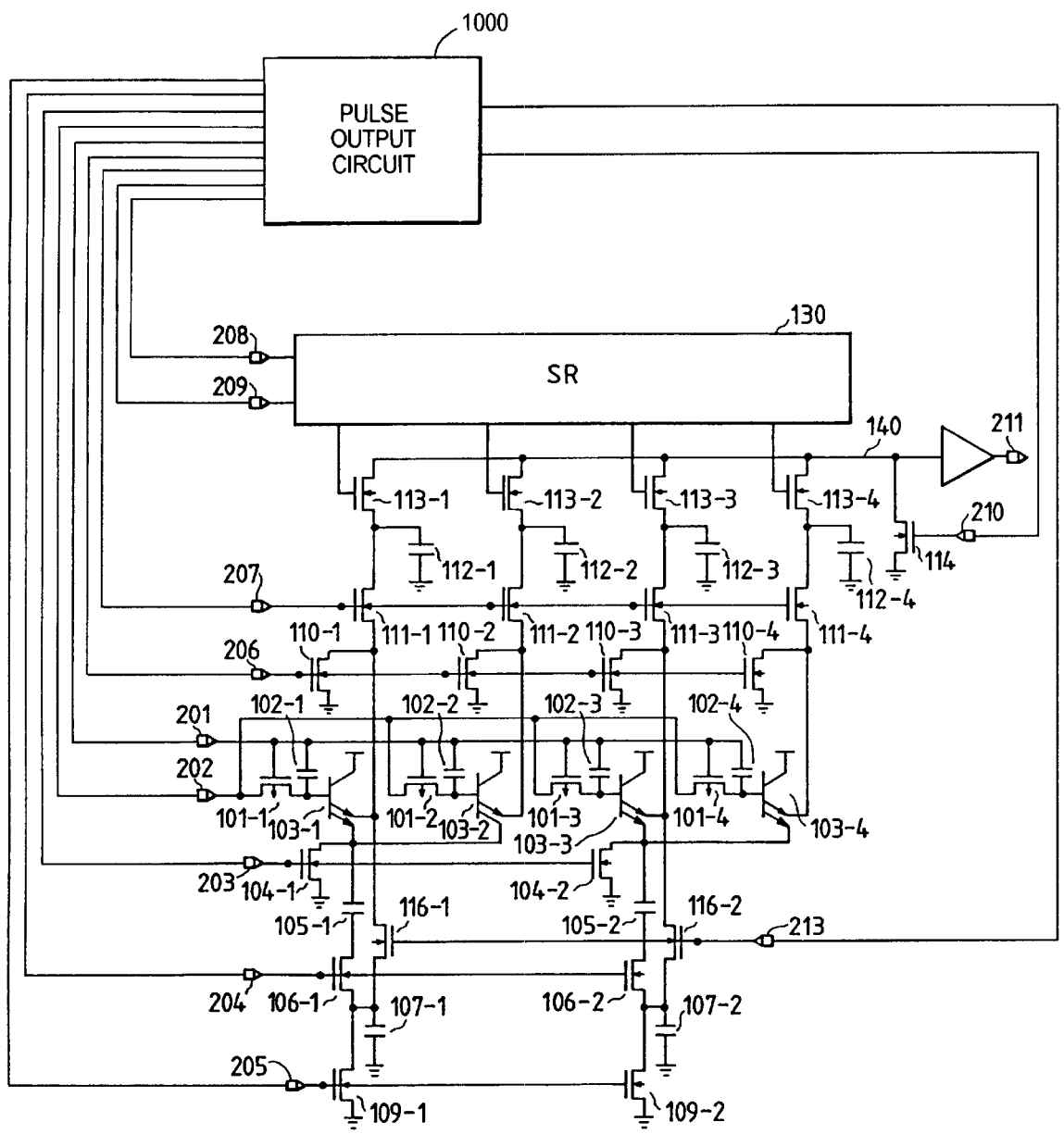
FIG. 19 is a circuit diagram of a block-structured embodiment of the present invention.

FIG. 19 shows a 7th embodiment of the present invention, wherein components equivalent to those in FIGS. 1 to 18 are represented by same numbers and will not be explained further. The photoelectric conversion element employed in the present embodiment is similar to that shown in FIG. 6. One of the two emitters is connected in common among the pixels constituting a pixel block, whereby the maximum voltage of the pixels constituting the block is accumulated in either of the buffer capacitances 107-1, 107-2. Such maximum voltages are transferred to the accumulation capacitances 112-1, 112-3 and output from the terminal 211 through the function of the scanning circuit 130.

In the arrangement shown in FIG. 19, pulses to be applied to the respective terminals are supplied from a pulse output circuit 1000.

The driving method of the present embodiment is similar to that explained in FIG. 15 or 16, whereby the terminal 203 is driven simultaneously with the terminal 206 to effect resetting and accumulation. Consequently, the output of each block representing the highest output level within the block, is read out, and the detecting operation is executed by this output in the ordinary state. It is also possible, based on the result of such detecting operation, to read out the signals of every pixels if necessary. As there is obtained the output of the pixel of highest output level among the plural pixels within the block, there can be achieved an improvement in the detecting precision and a significant reduction in the amount of signals, leading to a reduced cycle time and a reduction in the power consumption.

Figure 20:
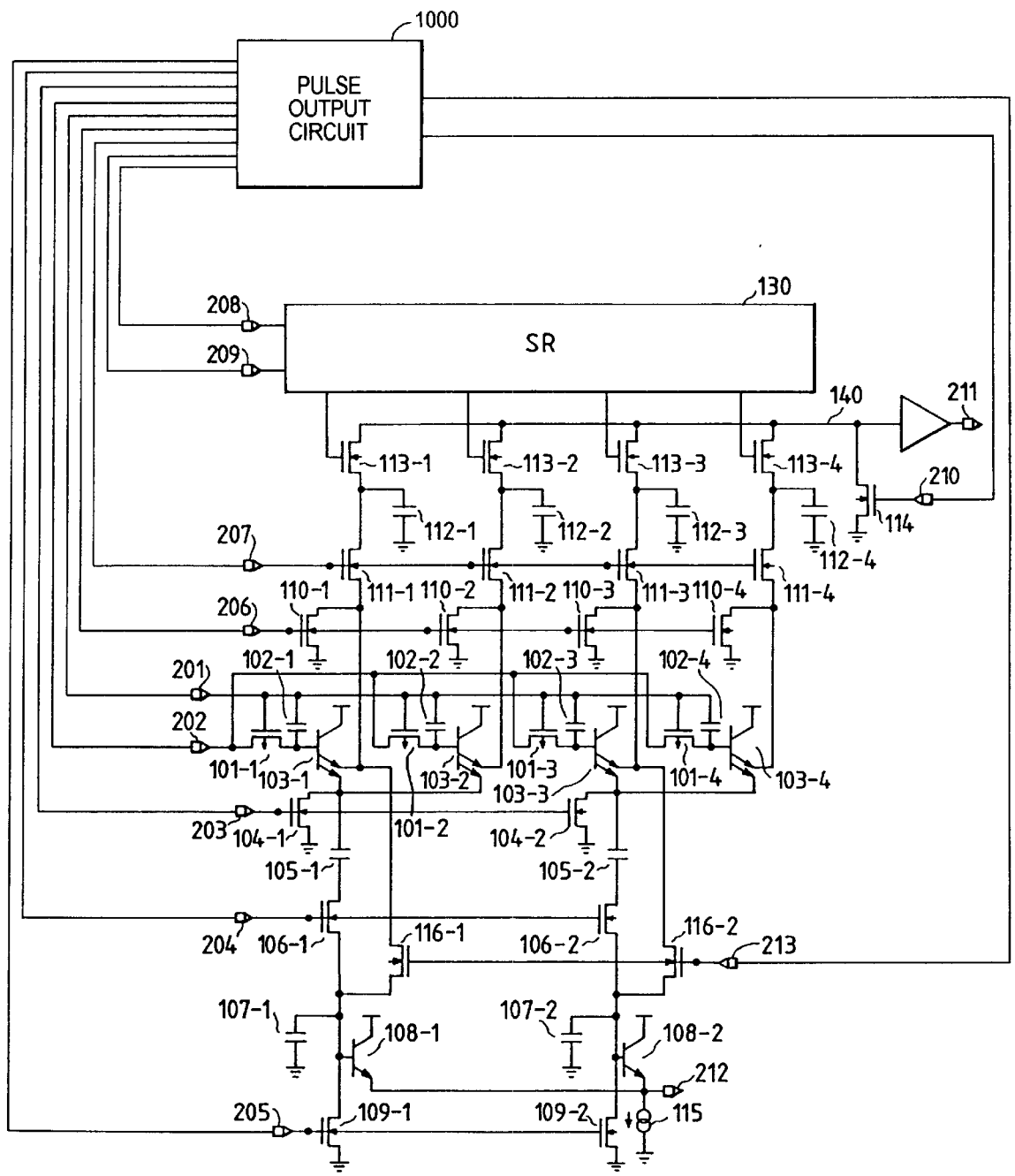
FIG. 20 is a circuit diagram of another block-structure embodiment of the present invention.

FIG. 20 shows an 8th embodiment of the present invention, wherein components equivalent to those in FIGS. 1 to 19 are represented by same numbers and will not be explained further. The present embodiment, corresponding to an improvement on the 7th embodiment, is provided the buffer capacitances 107-1, 107-2 at the output of the clamping circuits, with NPN transistors 108-1, 108-2 of which emitters are connected in common and further connected to a constant current source 115 and an output terminal 212.

In the arrangement shown in FIG. 20, pulses to be applied to the respective terminals are supplied from a pulse output circuit 1000.

In the present embodiment, after the clamping operation, the maximum value of the signals transferred to the buffer capacitances 107-1, 107-2 is immediately output to the terminal 212 without the function of the scanning circuit 130, so that the cycle time and the power consumption can be further reduced in comparison with the 7th embodiment. Instead of the NPN transistors employed in the present embodiment, there may be employed PNP transistors in emitter follower circuits to provide the minimum value of the block signals at the terminal 212. Consequently the present embodiment can achieve a function of detecting whether the signal is higher (or lower) than a predetermined level and then reading out the signals of the blocks or pixels based on the result of such detection according to the need so that the photoelectrically converted output can be obtained, matching the intention of photoelectric conversion.

Figure 21:
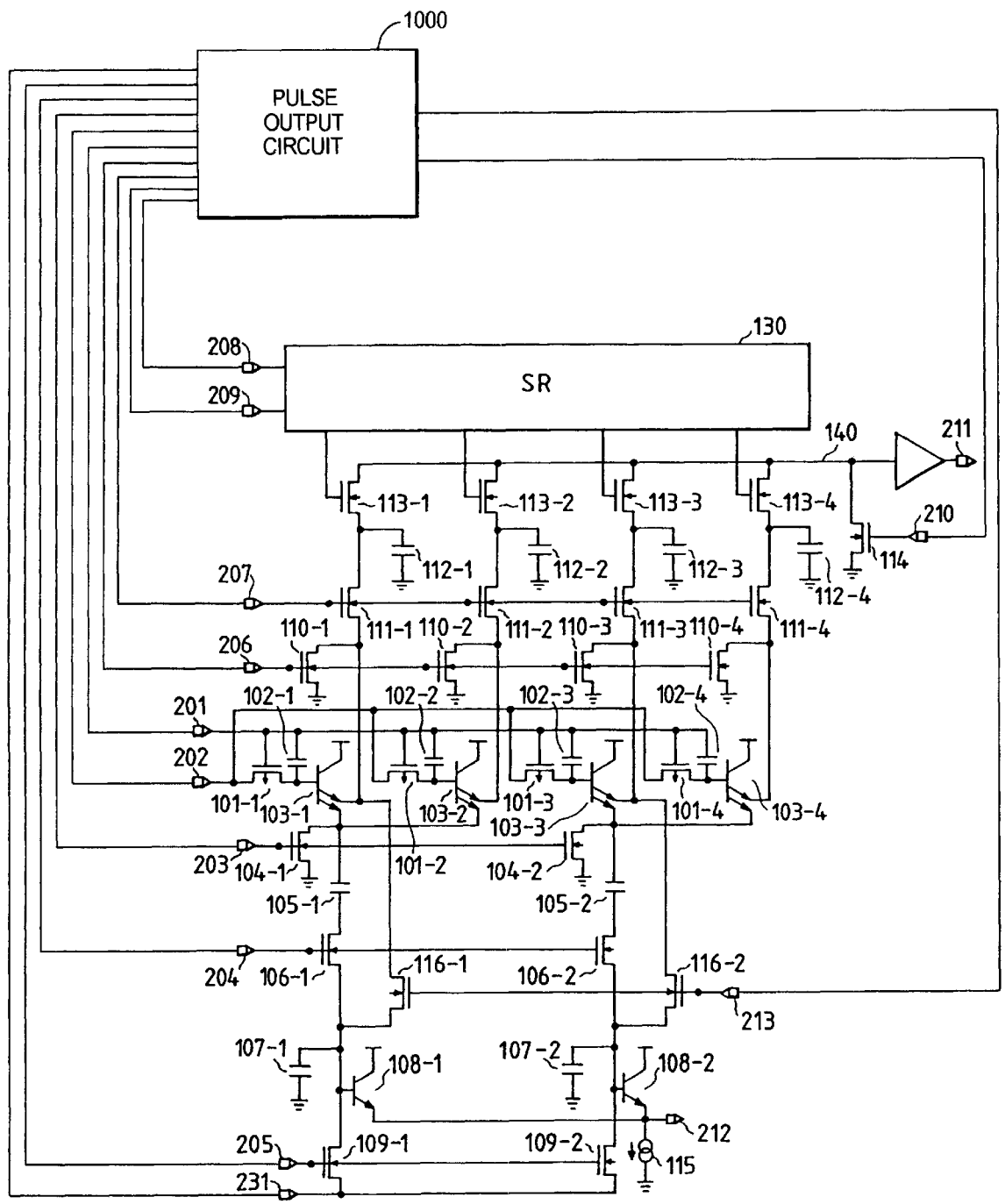
FIGS. 21 to 25 are circuit diagrams of still other block-structured embodiments of the present invention.

Also in FIG. 20, the buffer capacitances 107-1, 107-2 are reset to the ground potential by the NMOS transistors 109-1 and 109-2, but it is more effective for reading out small output voltages, as shown in FIG. 21, by providing a reset power source terminal 231 in order to generate a sufficient forward bias voltage between the bases and the emitters of the NPN transistors 108-1, 108-2.

In the arrangement shown in FIG. 21, pulses to be applied to the respective terminals are supplied from a pulse output circuit 1000.

Figure 22:
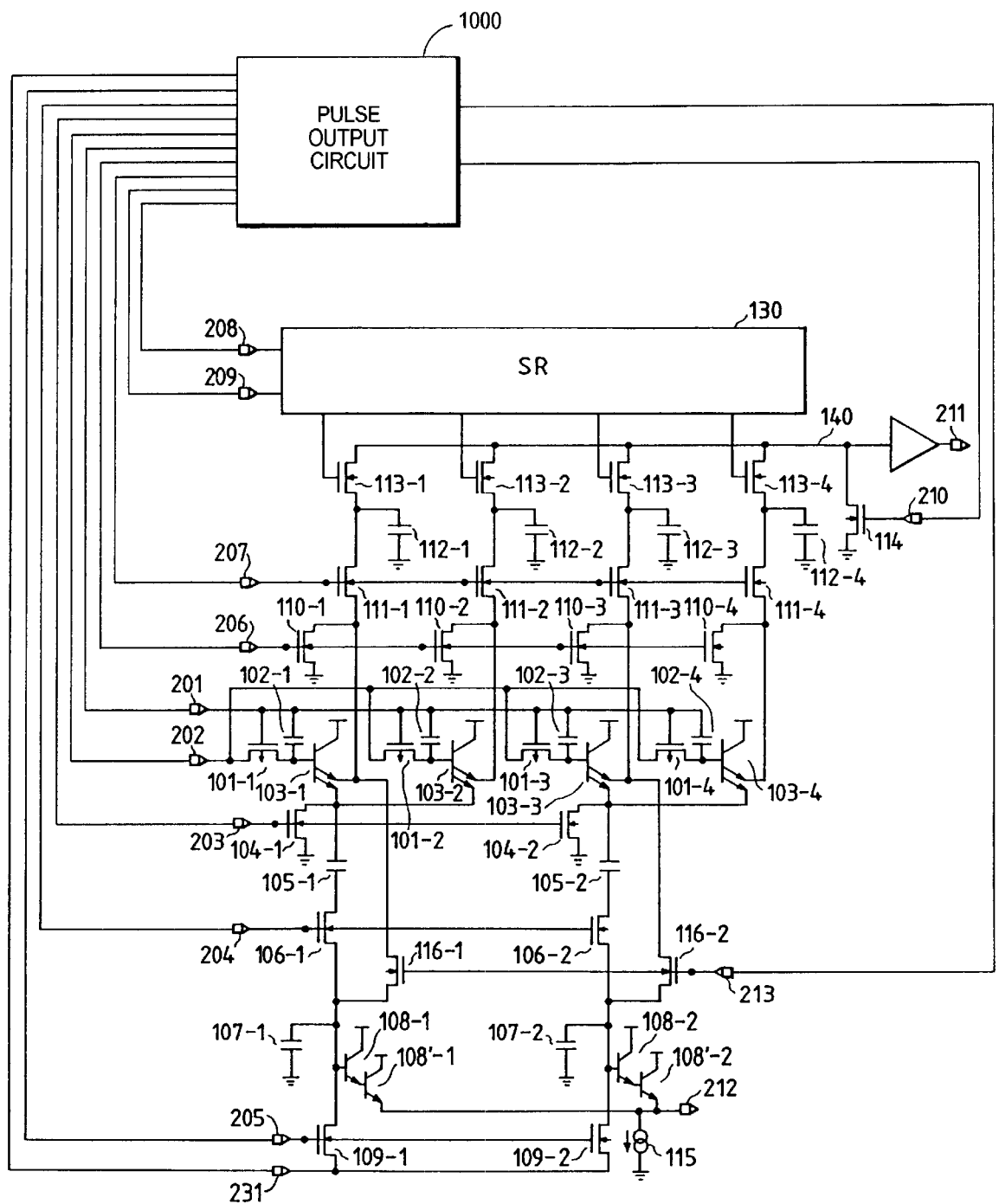

Also in the configuration shown in FIG. 20, the signals of the buffer capacitances 107-1, 107-2 are read out by the emitter follower circuits utilizing the constant current source 115, so that the signal voltage of the buffer capacitance declines, during a readout time TR, by:

$$\{(I0/\beta) \times TR\}/CB \tag{5}$$

wherein $\beta$ is the current amplification factor of the NPN transistors 108-1, 108-2, I0 is the current of the constant current source 115, and CB is the capacity of the buffer capacitance. Such loss in the signal voltage can be reduced to:

$$\{(I0/\beta^2) \times TR\}/CB \tag{6}$$

by employing Darlington emitter follower circuits as shown in FIG. 22, and can be brought to practically zero, by selecting a current amplification factor $\beta$ of ca. 1000, an I0 of several microamperes and a CB value of several picofarads.

In the arrangement shown in FIG. 22, pulses to be applied to the respective terminals are supplied from a pulse output circuit 1000.

Figure 23:
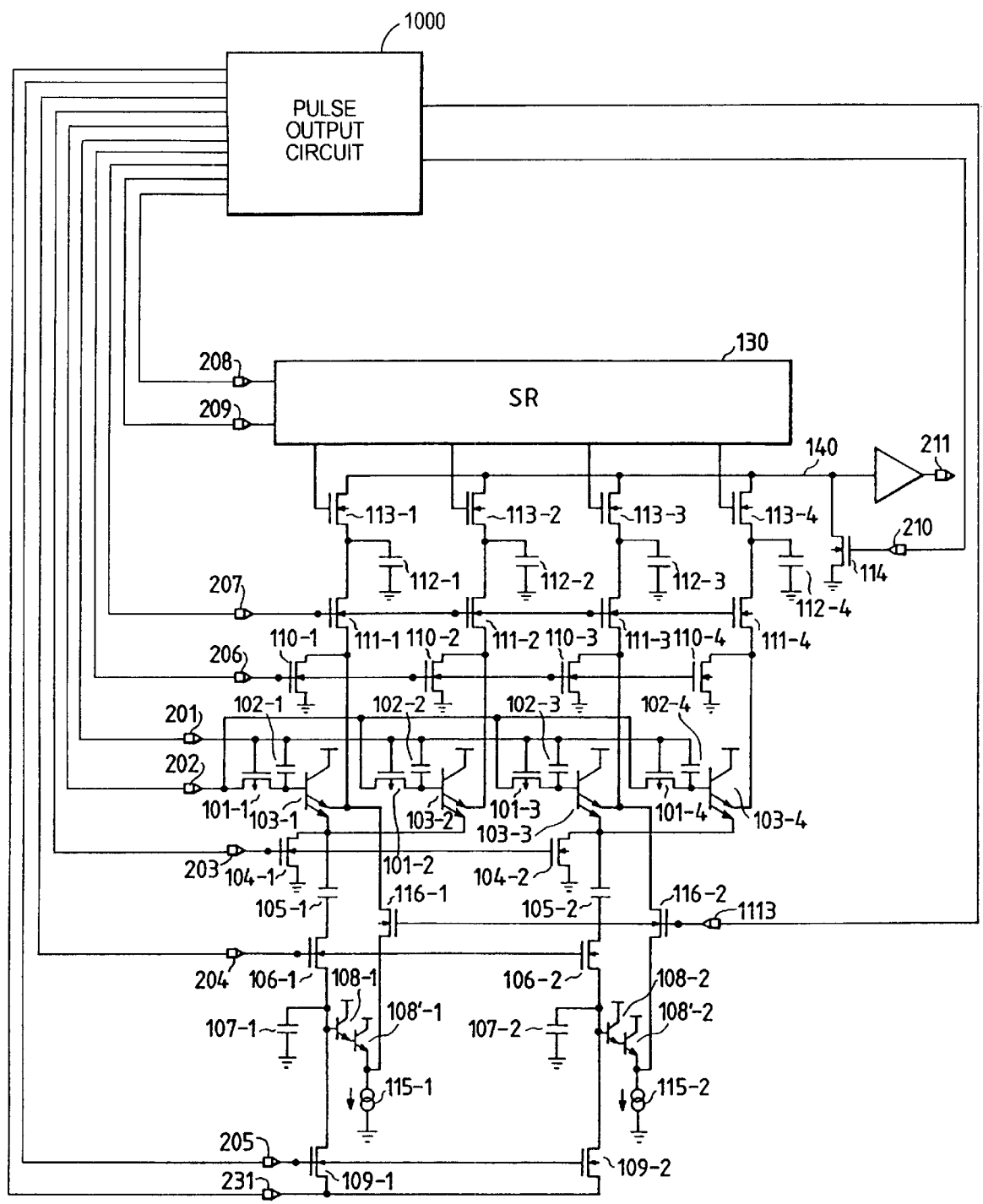

FIG. 23 shows a 9th embodiment of the present invention, wherein components equivalent to those in FIGS. 1 to 22 are represented by same numbers and will not be explained further. In the 6th to 8th embodiments, the buffer capacitances 107-1 to 107-4 and the accumulation capacitances 112-1 to 112-4 are connected through the switches 116-1 to 116-4, so that the transfer gain, represented by:

$$C_T/(C_T + C_{T2} + C_{S2}) \tag{7}$$

is in the order of 0.3 to 0.4, wherein:

$C_T$: capacity of the buffer capacitances 107-1 to 107-4;

$C_{T2}$: capacity of the accumulation capacitances 112-1 to 112-4;

$C_{S2}$: parasite capacity between the buffer capacitances 107-1 to 107-4 including the gate capacitances of the NMOS transistors 116-1 to 116-4 and the accumulation capacitances 112-1 to 112-4.

In the present embodiment, the buffer capacitances 107-1, 107-2 are provided with emitter follower circuits utilizing NPN transistors 108-1, 108-2 and the outputs thereof are connected to the accumulation capacitances 112-1, 112-3 through the switches 116-1, 116-2. Consequently, as regardless of the capacity of the parasite capacitance $C_{S2}$ the signals can be transferred to the accumulation capacitances 112-1 to 112-4 almost without loss. Such configuration is effective in case the signals from the sensors are small.

In the arrangement shown in FIG. 23, pulses to be applied to the respective terminals are supplied from a pulse output circuit 1000.

Figure 24:
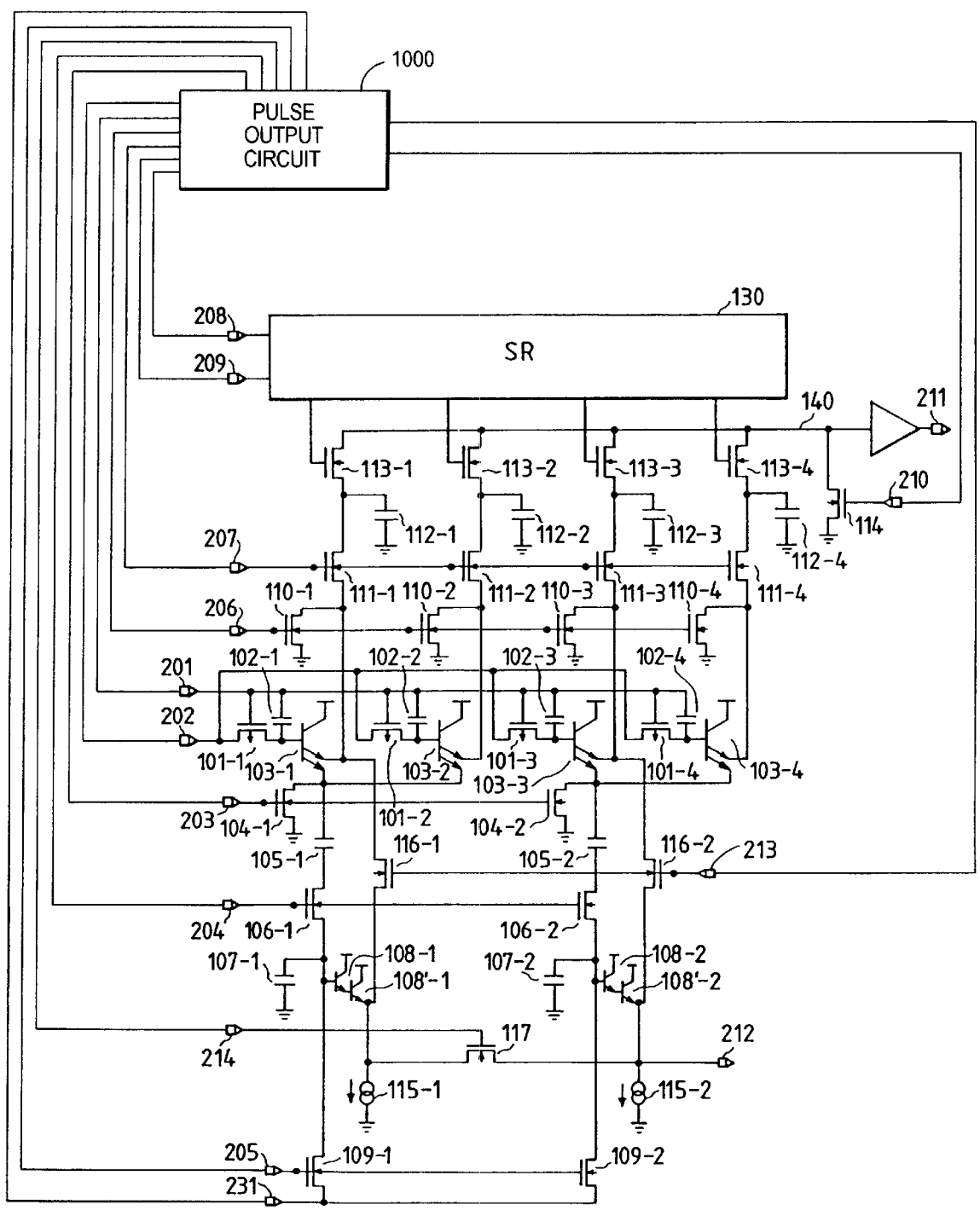

FIG. 24 shows a 10th embodiment of the present invention, wherein components equivalent to those in FIGS. 1 to 23 are represented by same numbers and will not be explained further. The present embodiment corresponds to a combination of the 8th and 9th embodiments, wherein the emitters of the NPN transistors 108-1, 108-2 of the 9th embodiment are connected by an NMOS transistor 117 to provide the maximum block output from the terminal 212. As explained in the 8th embodiment, the carriers of the buffer capacitance 107-2 can be immediately obtained as the maximum block output, and the carriers of the buffer capacitance 108-1 can also be obtained by the subsequent application of a high level pulse to the terminal 214. In this manner the block outputs can be read out without loss.

In the arrangement shown in FIG. 24, pulses to be applied to the respective terminals are supplied from a pulse output circuit 1000.

Figure 25:
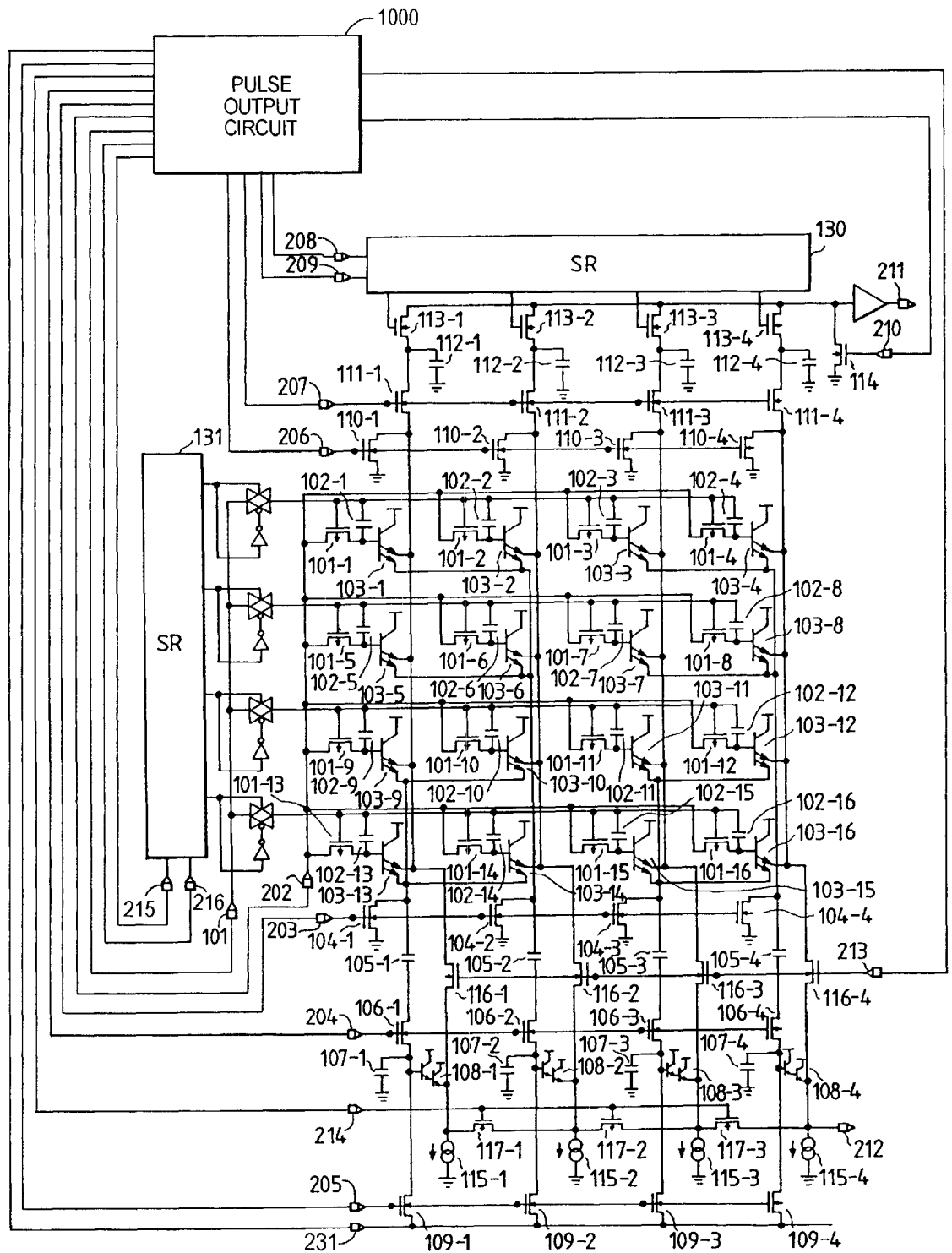

FIG. 25 shows an 11th embodiment of the present invention, wherein components equivalent to those in FIGS. 1 to 24 are represented by same numbers and will not be explained further. The present embodiment, corresponding to a modification of the 10th embodiment, provides a two-dimensional array of the photoelectric conversion elements, wherein a block is formed by two pixels in the vertical direction and two pixels in the horizontal direction. FIG. 25 shows a 4×4 area sensor with 2×2 blocks, of which outputs are transferred through clamping circuits to the capacitances 107-1 to 107-4, while the pixel signals are transferred to the accumulation capacitances 112-1 to 112-4 driven by a vertical shift register 131. Time-sequential three-level pulses are applied from a terminal 101 to control the timing of resetting and accumulation of the pixels. The vertical shift register 131, receiving clock signals and timing signals from terminals 215, 216, releases pulses signals in succession, thereby scanning the pixels by turning on and off the switches. In response to these scanning signals and the pulses supplied from various terminals, the photocarrier output signals accumulated in the bases of the NPN transistors 103-1 to 103-16, each having two emitters and constituting the pixels, are transferred to the accumulation capacitances 112-1 to 112-4 and also, in a blockwise operation, to the buffer capacitances 107-1 to 107-4 through the coupling capacitances 105-1 to 105-4.

Thus, in response to a high level pulse to the terminal 206, the accumulation capacitances 112-1 to 112-4 are reset and the maximum block charges in the buffer capacitances 107-1 to 107-4 are transferred through the switch means 116-1 to 116-4 and output in succession from the terminal 211.

Also in response to a pulse applied to the terminal 214, there can be obtained, from the terminal 212, an output corresponding to the maximum among all the 16 pixels.

In the arrangement shown in FIG. 25, pulses to be applied to the respective terminals are supplied from a pulse output circuit 1000.

The present embodiment can provide a wider image pickup area than in the 10th embodiment, by the addition of the photoelectric conversion pixels and the vertical scanning circuit, thereby enabling more precise detection with a higher sensitivity. Also the average value of the vertical pixels can be obtained without additional cycle time, by forming each vertical column of the present embodiment into a block and accumulating the average of the pixel signals in a buffer capacitance.

In the foregoing embodiment, the block signals are detected by the peak signals utilizing the NPN transistors 108-1, 108-2, but there may also be employed PNP transistors for detecting bottom signals. Also these two configurations may both be employed for achieving finer detection, according to the purpose of the photoelectric conversion device.

Also the foregoing embodiments have been constructed with the bipolar photoelectric conversion elements, but similar effects can also be obtained with other photoelectric conversion elements such as CMOS, CMD, AMI or FGA.

As explained in the foregoing, the device of the present invention, capable of releasing both an output signal obtained by pre-processing of the pixel signals and output signals of every pixels, can reduce the serial transfer time by such pre-processed signal output, in addition to the signal output in the conventional scanning operation. Also the presence or absence of the image can be speedily detected, without extension of the cycle time by the addition of the signal transfer time, even in case with a large number of pixels or in case of an area sensor with plural rows and columns.

Also the fixed pattern noise can be effectively eliminated by the clamping circuits constituting the pre-processing circuits.

Also the block formation of plural columns allows to reduce the amount of pixel signals and the cycle time, and the retain/transfer circuits and the output circuit can be used in common for the unprocessed signals. Thus there can be provided a high-speed and inexpensive solid-state image pickup device of a low power consumption without a major increase in the chip size.

What is claimed is:

1. A solid-state image pickup device on a chip, comprising:
   a plurality of photoelectric conversion pixels, each for converting optical signals into electrical signals;
   a plurality of readout units adapted to read out the electric signal from each of said plurality of photoelectric conversion pixels to a common output line;
   pre-process circuitry adapted to pre-process signals from said plurality of photoelectric conversion pixels;
   a first path for outputting the electric signal output from each of said plurality of photoelectric conversion pixels to one or more readout units through said pre-process circuitry; and
   a second path arranged in parallel with said first path, for outputting the electrical signal from each of said plurality of photoelectric conversion pixels to said one or more readout units but not through said pre-process circuitry,
   wherein the electrical signal output from said first path and the electrical signal output from said second path are each selectively read out to said common output line through a common one of said readout units.

2. A solid state image pickup device according to claim 1, wherein said pre-process circuitry comprises a clamping circuit.

3. A device according to claim 1, further comprising a buffer unit that receives an output of said pre-process circuitry.

4. A solid-state image pickup device according to claim 3, wherein said buffer unit includes a buffer capacitance.

5. A device according to claim 1, further comprising a switch control unit including a switch that connects an output portion of said pre-process circuitry to an output portion of each photoelectric conversion pixel.

6. A device according to claim 5, further comprising a transfer unit adapted to accumulate the output of each photoelectric conversion pixel and the output of said pre-process circuitry.

7. A solid-state image pickup device according to claim 6, wherein said switch is turned on after an electrical signal accumulated in said transfer unit is dissipated.

8. A solid-state image pickup device provided with plural photoelectric conversion pixels for converting optical signals into electrical signals, and a transfer unit that outputs the electrical signals from said photoelectric conversion pixels, comprising:
- pre-process circuitry adapted to pre-process the electrical signals from said photoelectric conversion pixels;
- a buffer including a plurality of elements adapted to transfer the output of said pre-process unit to a next stage; and
- a switch that transfers the output of said buffer to said transfer unit,
- wherein said switch is turned on for a block of a plurality of said buffer elements.

9. A solid-state image pickup device provided with a photoelectric conversion unit including a photoelectric conversion element for converting an optical signal into an electrical signal, a transfer unit with an accumulation capacitance for transferring said electrical signal, and a scanning unit adapted to output the charge of said accumulation capacitance to an output line, comprising:
- pre-process circuitry with a coupling capacitance for temporarily storing said electrical signal;
- a buffer provided with a buffer capacitance for receiving the charge of said coupling capacitance; and
- a switch that transfers the charge of said buffer capacitance to said accumulation capacitance.

10. A solid-state image pickup device according to claim 9, wherein said photoelectric conversion element includes an NPN transistor having two emitters, one of which is connected to an end of said switch and to said transfer unit, while the other of which is connected to said pre-process circuitry.

11. A solid-state image pickup device according to claim 9, further comprising a buffer output element for outputting the charge of said buffer capacitance.

12. A solid-state image pickup device according to claim 11, wherein said buffer output element is adapted to the charge of said buffer capacitance obtained in a block composed of plural photoelectric conversion pixels, in superposed manner for plural blocks.

13. An image pickup method for a solid-state image pickup device provided with a photoelectric conversion unit including a photoelectric conversion element for converting an optical signal into an electrical signal, a transfer unit provided with an accumulation capacitance for transferring said electrical signal, and a scanning unit adapted to output the charge of said accumulation capacitance to an output line, comprising steps of:
- accumulating the charge of said electrical signal temporarily in a coupling capacitance;
- transferring the charge of said coupling capacitance to a buffer capacitance;
- dissipating the charge of said accumulation capacitance; and
- transferring the charge of said buffer capacitance to said accumulation capacitance.

14. A solid-state image pickup device on a chip, comprising:
- a plurality of photoelectric conversion pixels, each for converting an optical signal into an electrical signal;
- a plurality of read-out units adapted to read out the electric signal from each of said plurality of photoelectric conversion pixels to a common output line;
- an operation unit adapted to perform an operation involving a difference between two signals;
- a first path for outputting the electrical signal output from each of said plurality of photoelectric conversion pixels to said read-out units through said operation unit; and
- a second path arranged in parallel with said first path, for outputting the electrical signal output from the same photoelectric conversion pixel as that whose electrical signal is output to said first path, to said read-out units not through said operation unit,
- wherein each of the electrical signal output from said first path and the electrical signal output from said second path are selectively read out to said common output line through a common one of said read-out units.

15. A device according to claim 14, wherein said two signals are an addition signal of the electrical signal corresponding to the optical signal and a noise signal, and the noise signal.

16. A device according to claim 15, wherein said operation unit is a clamp circuit.

17. A solid-state image pickup device on a chip, comprising:
- a plurality of photoelectric conversion pixels, each for converting an optical signal into an electrical signal;
- a plurality of read-out units adapted to read out the electric signal from each of said plurality of photoelectric conversion pixels to a common output line;
- an operation unit adapted to perform an operation among outputs of at least two of said plurality of photoelectric conversion pixels;
- a first path for outputting the electrical signal output from each of said photoelectric conversion pixels to said read-out units through said operation unit; and
- a second path arranged in parallel with said first path, for outputting the electrical signal output from the same photoelectric conversion pixel as that whose electrical signal is output to said first path, to said read-out unit not through said operation unit,
- wherein each of the electrical signal output from said first path and the electrical signal output from said second path are selectively read out to said common output line through a common one of said read out units.

18. A device according to claim 17, wherein said operation unit performs addition of the outputs of said at least two photoelectric conversion pixels.

19. A device according to claim 18, wherein said operation unit includes a connection device adapted to connect the outputs of said at least two photoelectric conversion pixels to each other.

20. A device according to claim 19, wherein said connection device includes a MOS transistor.

21. A device according to claim 17, wherein said operation unit performs processing for outputting the maximum or minimum value of said at least two photoelectric conversion pixels.

22. A device according to claim 17, wherein said operation unit is connected to the outputs of said at least two photoelectric conversion pixels.

23. A device according to claim 17, wherein said operation unit is connected to the outputs of said at least two photoelectric conversion pixels through block buffer element.

24. A solid-state image pickup apparatus on a chip, comprising:
- a plurality of photoelectric conversion pixels, each for converting optical signals into electrical signals;
- a plurality of readout units adapted to read out the electrical signals from each of said plurality of photoelectric conversion pixels to a common output line;
- a first processing unit adapted to perform first processing on the electrical signals output from said plurality of photoelectric conversion pixels;

a second processing unit adapted to perform second processing different from the first processing on the electrical signals output from said plurality of photoelectric conversion pixels;

a first path for outputting the electrical signal output from each of said plurality of photoelectric conversion pixels through said first processing unit; and a second path arranged in parallel with said first path, for outputting the electrical signal from each of said plurality of photoelectric conversion pixels to said readout units through said second processing unit, wherein the electrical signal output from said first path and the electrical signal output from said second path are each selectively read out to said common output line though a common one of said readout units.

25. A solid-state image pickup device comprising:

a plurality of photoelectric conversion pixels each for generating a photoelectrical signal, each photoelectric conversion pixel including a first respective amplifier transistor for amplifying the photoelectrical signal and outputting the amplified signal;

a plurality of common connection portions for connecting in common main electrodes of the first amplifier transistors included respectively in said plurality of photoelectric conversion pixels on the units of a predetermined number of photoelectric conversion pixels, to output maximums and minimums of the photoelectrical signals on the units of said predetermined number of photoelectric conversion pixels;

a plurality of second amplifier transistors having control electrodes that are connected to said plurality of common connection portions respectively, and being arranged to output a maximum and minimum of the maximum and minimums output from said plurality of common connection portions;

a common output line for connecting in common main electrodes of said plurality of second amplifier transistors; and a subtraction unit adapted to perform a subtraction operation, formed between (1) said main electrodes of said first amplifier transistors and (2) said control electrodes of said second amplifier transistors.

26. A device according to claim 25, wherein said first amplifier transistor amplifies the photoelectrical signal and outputs the amplified signal from a control electrode to the main electrode.

27. A device according to claim 25, wherein said subtraction unit includes a clamp circuit.

28. An image pickup apparatus comprising:

a solid-state image pickup element on a chip, including:

a plurality of photoelectric conversion pixels;

a plurality of readout units adapted to read out a signal from each of said plurality of photoelectric conversion pixels to a common output line;

pre-process circuitry adapted to pre-process signals from said plurality of photoelectric conversion pixels;

a first path for outputting the signal output from a first photoelectric conversion pixel included in said plurality of photoelectric conversion pixels to a first readout unit included in said plurality of readout units through said pre-process circuitry;

a second path arranged in parallel with said first path, for outputting the signal output from the first photoelectric conversion pixel to said first readout unit through the common output line;

a scanning circuit; and a pulse output circuit adapted to output a pulse to said scanning circuit.

29. An apparatus according to claim 28, wherein said pre-process circuitry comprises a clamping circuit.

30. An apparatus according to claim 28, wherein said pre-process circuitry includes a mixing circuit adapted to mix a plurality of signals.

31. An apparatus according to claim 30, wherein said mixing circuit mixes the signals from said plurality of photoelectric conversion pixels.

32. An apparatus according to claim 28, wherein said pre-process circuitry includes a differential circuit adapted to perform a differential processing on a plurality of signals.

33. An image pickup apparatus comprising:

a solid-state image pickup element on a chip, including:

a plurality of photoelectric conversion pixels;

a plurality of readout units adapted to read out a signal from each of said plurality of photoelectric conversion pixels to a common output line;

a first processing unit adapted to perform first processing on the signals output from said plurality of photoelectric conversion pixels;

a second processing unit adapted to perform second processing different from the first processing on the signals output from said plurality of photoelectric conversion pixels;

a first path for outputting the signal output from a first photoelectric conversion pixel included in said plurality of photoelectric conversion pixels to a first readout unit included in said plurality of readout units through said first processing unit;

a second path arranged in parallel with said first path, for outputting the same signal output from the first photoelectric conversion pixel to said first readout unit though said second processing unit;

a scanning circuit; and a pulse output circuit adapted to output a pulse to said scanning circuit.

34. An apparatus according to claim 33, wherein said first processing unit includes a clamp circuit.

35. An apparatus according to claim 33, wherein said first processing circuit include a mixing circuit adapted to mix a plurality of signals.

36. An apparatus according to claim 35, wherein said mixing circuit mixes the signals from said plurality of photoelectric conversion pixels.

37. An apparatus according to claim 33, wherein said first processing circuit includes a differential circuit adapted to perform a differential processing on a plurality of signals.

38. A driving method for a solid-state image pickup element on a chip that comprises a plurality of photoelectric conversion pixels, a plurality of readout units adapted to read out a signal from each of the plurality of photoelectric conversion pixels to a common output line, and a pre-process circuit adapted to pre-process signals from the plurality of photoelectric conversion pixels, said method comprising the steps of:

outputting a signal output from a first photoelectric conversion pixel included in the plurality of photoelectric conversion pixels to a first readout unit included in the plurality of readout units through a first path including the pre-process circuit;

outputting the signal output from the first photoelectric conversion pixel to the first readout unit through a second path being arranged in parallel with the first path not including the pre-process circuit; and selectively transferring the signal from the first path and the signal from said second path to the first readout unit.

39. A method according to claim 38, wherein the pre-process circuit includes a clamp circuit.

40. A method according to claim 38, wherein the pre-process circuit includes a mixing circuit adapted to mix a plurality of signals.

41. A method according to claim 40, wherein the mixing circuit mixes the signals, from the plurality of photoelectric conversion pixels.

42. A method according to claim 38, wherein the pre-process circuit includes a differential circuit adapted to perform a differential processing on a plurality of signals.

43. A driving method for a solid-state image pickup element on a chip that comprises a plurality of photoelectric conversion pixels, a plurality of readout units adapted to read out a signal from each of the plurality of photoelectric conversion pixels to a common output line, a first processing circuit adapted to perform a first processing on signals from the photoelectric conversion pixels, and a second processing circuit adapted to perform a second processing different from the first processing on the signals from the plurality of photoelectric conversion pixels, said method comprising the steps of:

outputting a signal output from a first photoelectric conversion pixel included in the plurality of photoelectric conversion pixels to a first readout unit included in the plurality of readout units through a first path including the first processing circuit;

outputting the signal output from the first photoelectric conversion pixel to the first readout unit through a second path arranged in parallel with the first path and including the second processing circuit; and selectively transferring the signal from the first path and the signal from the second path to the first readout unit.

44. A method according to claim 43, wherein the first processing circuit includes a clamp circuit.

45. A method according to claim 43, wherein the first processing circuit includes a mixing circuit adapted to mix a plurality of signals.

46. A method according to claim 45, wherein the mixing circuit mixes the signals from the plurality of photoelectric conversion pixels.

47. A method according to claim 43, wherein the first processing circuit includes a differential circuit adapted to perform a differential processing on a plurality of signals.

* * * * *

UNITED STATES PATENT AND TRADEMARK OFFICE
CERTIFICATE OF CORRECTION

PATENT NO. : 6,657,664 B2
DATED : December 2, 2003
INVENTOR(S) : Isamu Ueno

It is certified that error appears in the above-identified patent and that said Letters Patent is hereby corrected as shown below:

<u>Column 7,</u>
Line 54, "capacitances 32-1, 32-2" should read -- capacitances 36-1, 36-2 --.

<u>Column 9,</u>
Line 31, "following" should read -- following, --;
Line 39, "pro-process" should read -- pre-process --; and
Line 64, "pro-processed" should read -- pre-processed --.

<u>Column 12,</u>
Lines 57 and 59, "is" should read -- are --; and
Line 61, "out the" should read -- out to the --.

<u>Column 15,</u>
Line 27, "pulses" should read -- pulse --.

<u>Column 16,</u>
Lines 27 and 32, "electric" should read -- electrical --;
Line 28, "signal" should read -- signals --;
Line 46, "solid state" should read -- solid-state --.

<u>Column 19,</u>
Line 5, "output" should be deleted;
Line 15, "though" should read -- through --.

UNITED STATES PATENT AND TRADEMARK OFFICE
CERTIFICATE OF CORRECTION

PATENT NO. : 6,657,664 B2
DATED : December 2, 2003
INVENTOR(S) : Isamu Ueno

It is certified that error appears in the above-identified patent and that said Letters Patent is hereby corrected as shown below:

Column 20,
Line 15, "clement" should read -- element --;
Line 35, "though" should read -- through --; and
Line 44, "include" should read -- includes --.

Signed and Sealed this

Thirteenth Day of July, 2004

JON W. DUDAS
*Acting Director of the United States Patent and Trademark Office*